US008308406B2

(12) United States Patent
Parks et al.

(10) Patent No.: US 8,308,406 B2
(45) Date of Patent: Nov. 13, 2012

(54) WHEELCHAIR STABILIZING DEVICE

(75) Inventors: Micheal Duane Parks, Knoxville, IL (US); Donna Pauline Kidwell, Knoxville, IL (US); Patrick Joseph Kidwell, Knoxville, IL (US)

(73) Assignee: Fall Less Designs & Equipment, Inc., Knoxville, IL (US)

( * ) Notice: Subject to any disclaimer, the term of this patent is extended or adjusted under 35 U.S.C. 154(b) by 78 days.

(21) Appl. No.: 12/651,831

(22) Filed: Jan. 4, 2010

(65) Prior Publication Data

US 2010/0171284 A1 Jul. 8, 2010

Related U.S. Application Data

(60) Provisional application No. 61/142,890, filed on Jan. 6, 2009, provisional application No. 61/152,954, filed on Feb. 16, 2009, provisional application No. 61/263,463, filed on Nov. 23, 2009, provisional application No. 61/264,802, filed on Dec. 1, 2009.

(51) Int. Cl.
*B60P 7/08* (2006.01)

(52) U.S. Cl. ................................................ 410/7; 410/4

(58) Field of Classification Search .................. 410/2, 3, 410/4, 7, 51, 80, 23, 9, 19, 12; 280/304.1; 296/65.04; 297/DIG. 4; 248/503.1
See application file for complete search history.

(56) References Cited

U.S. PATENT DOCUMENTS

| | | | |
|---|---|---|---|
| 1,635,575 | A | 7/1927 | Cole |
| 3,955,847 | A | 5/1976 | Schiowitz |
| 4,019,752 | A | 4/1977 | Leon et al. |
| 4,060,271 | A | 11/1977 | Williams |
| 4,076,268 | A | 2/1978 | Hart |
| 4,093,303 | A | 6/1978 | Nelson |
| 4,113,270 | A | 9/1978 | Barecki |
| 4,221,396 | A | 9/1980 | Kehl |
| 4,257,644 | A | 3/1981 | Stephens |
| 4,427,210 | A | 1/1984 | Wevers |
| 4,457,551 | A | 7/1984 | Anthony |
| 4,475,762 | A | 10/1984 | DeLong et al. |
| 4,492,403 | A | 1/1985 | Blomgren et al. |
| 4,511,171 | A | 4/1985 | Petersen |
| 4,588,340 | A | 5/1986 | Howard |
| 4,671,713 | A | 6/1987 | Lenkman |
| 4,688,843 | A | 8/1987 | Hall |

(Continued)

FOREIGN PATENT DOCUMENTS

| | | |
|---|---|---|
| CA | 1084777 | 9/1980 |

(Continued)

OTHER PUBLICATIONS

"Access Marine Design and Fabrication Wheelchair Stabilizer", Access Marine Design and Fabrication , Inc., http://web.archive.org/web.20070706190143/http://www.accessmarine.org/ Printed from Internet Jul. 6, 2010, 7 pages, first on web site Nov. 30, 2004.

(Continued)

*Primary Examiner* — Stephen Gordon
(74) *Attorney, Agent, or Firm* — McKee, Voorhees & Sease, P.L.C.

(57) ABSTRACT

A wheelchair stabilizing device is presented. The device includes a latch spring-biased in the closed position, a mounting bracket, and a swing arm connecting the latch and the mounting bracket. Methods of use and manufacture are also provided.

17 Claims, 37 Drawing Sheets

U.S. PATENT DOCUMENTS

| | | | |
|---|---|---|---|
| 4,690,364 | A | 9/1987 | Constantin |
| 4,730,964 | A | 3/1988 | Joyner |
| 4,826,193 | A | 5/1989 | Davis |
| 4,886,403 | A | 12/1989 | Gresham |
| 4,971,341 | A | 11/1990 | Magnuson |
| 4,973,022 | A | 11/1990 | Mayland |
| 4,995,775 | A | 2/1991 | Gresham |
| 5,052,647 | A | 10/1991 | Axelson et al. |
| 5,074,507 | A | 12/1991 | Axelson et al. |
| 5,127,113 | A | 7/1992 | Di Matteo et al. |
| 5,344,265 | A | 9/1994 | Ullman et al. |
| 5,388,937 | A | 2/1995 | Farsai |
| 5,391,030 | A | 2/1995 | Lee |
| 5,509,680 | A | 4/1996 | Scharf et al. |
| 5,888,038 | A | 3/1999 | Ditch et al. |
| 6,287,060 | B1 | 9/2001 | Girardin |
| 6,428,254 | B2 | 8/2002 | Craft |
| 6,471,454 | B1 * | 10/2002 | Koller ............................... 410/7 |
| 6,474,916 | B2 | 11/2002 | Constantin |
| 6,607,470 | B2 | 8/2003 | Catanescu et al. |
| 6,685,403 | B2 | 2/2004 | Constantin |
| 6,702,313 | B2 | 3/2004 | Forshee et al. |
| 6,872,037 | B2 | 3/2005 | Girardin |
| 6,918,722 | B1 | 7/2005 | Girardin |
| 7,040,847 | B1 | 5/2006 | Cardona |
| 7,104,740 | B2 | 9/2006 | Girardin |
| 7,108,466 | B2 | 9/2006 | Panzarella et al. |
| 7,229,238 | B2 | 6/2007 | Girardin et al. |
| 7,296,960 | B2 | 11/2007 | Strong |
| D573,875 | S | 7/2008 | Anderson |
| 7,431,546 | B2 | 10/2008 | Panzarella et al. |
| 7,452,170 | B2 | 11/2008 | Girardin |
| 7,510,345 | B2 | 3/2009 | Kosh et al. |
| 7,637,705 | B2 | 12/2009 | Girardin et al. |
| 7,686,562 | B2 | 3/2010 | Panzarella et al. |
| 7,717,655 | B2 | 5/2010 | Cardona |
| 7,736,104 | B2 | 6/2010 | Hobson |
| 7,753,630 | B2 | 7/2010 | Jeppsson |
| 2006/0249617 | A1 | 11/2006 | Cardona |
| 2008/0079252 | A1 | 4/2008 | Shutter et al. |
| 2009/0016836 | A1 | 1/2009 | Girardin et al. |
| 2009/0078811 | A1 | 3/2009 | Dick et al. |
| 2009/0087278 | A1 | 4/2009 | Girardin et al. |
| 2009/0309344 | A1 | 12/2009 | van Roosmalen et al. |
| 2010/0086375 | A1 | 4/2010 | Tremblay et al. |

FOREIGN PATENT DOCUMENTS

| | | | |
|---|---|---|---|
| CA | 1086140 | | 9/1980 |
| CA | 1134207 | | 10/1982 |
| CA | 1160907 | | 1/1984 |
| CA | 2077879 | | 7/1997 |
| CA | 2248472 | | 3/1999 |
| CA | 2427531 | | 5/2002 |
| CA | 2570910 | | 6/2008 |
| DE | 3636492 | C2 | 4/1988 |
| EP | 1837003 | B1 | 1/2010 |
| FR | 2740410 | | 4/1997 |
| GB | 2328917 | A | 3/1999 |
| GB | 2430466 | A | 3/2007 |
| GB | 2442186 | A | 3/2008 |
| GB | 2435193 | B | 10/2008 |
| GB | 2453028 | A | 3/2009 |
| JP | 8244619 | | 9/1996 |
| WO | 2005102775 | A1 | 11/2005 |
| WO | 2008039810 | A3 | 4/2008 |
| WO | 2009009726 | A1 | 1/2009 |
| WO | 2009029773 | A2 | 3/2009 |
| WO | 2010040138 | A2 | 4/2010 |

OTHER PUBLICATIONS

MobilityWorks, "EZ Lock Wheelchair Docking Systems", http://www.mobilityworks.com/ezlock.php, printed Internet on Jul. 6, 2010, 2 pages.

http://www.dhss.mo.gov/InterventionMICA/InjuryFromFalls/olderadults.html (accessed Oct. 23, 2008).

Hill, Elizabeth E., Falls and Fall-Related Injuries in Elderly Nursing Home Residents: Exploring the Person and Environment, http://stti.confex.com/stti/bc39/techprogram/paper_35623.html (accessed Oct. 23, 2008).

Berg, Katherine, et al., Wheelchair Users at Home: Few Home Modifications and Many Injurious Falls, American Journal of Public Health; Jan. 2002, vol. 92, No. 1.

Xiang, H., et al., Wheelchair Related Injuries in US Emergency Departments, Injury Prevention 2006; 12; 8-11.

The National AgrAbility Project Staff., Secondary Injury Prevention and Farming From a Wheelchair, 2006-2007.

Huey-Ming Tzeng, PhD, RN; Chang—Yi Yin, MA, Nurses' Solution to Prevent Inpatient Falls in Hospital Rooms. Nur. Econ. 2008; 26 (3): 179-187.

2007 Disability Status Report: United States, Cornell University, www.disabilitystatistics.org.

H. Stephen Kaye, Taewoon Kang, and Mitchell P. LaPlanta, Wheelchair Use in the United States, Disability Statistics Center, Abstract 23, May 2002.

Health, United States, 2008, 32nd Annual Report by the Sec. of the Dept. of Health and Human Services for the President and Congress.

Marjory Garrison, Open Dates, Home Care, Oct. 1, 2002.

Disability and Health in the United States, 2001-2005, U.S. Department of Health and Human services, Jul. 2008, DHHS Publication No. (PHS) 2008-1035.

Boninger, Michael L., et al., Pushrim biomechanics and injury prevention in spinal cord injury: Recommendations based on CULP-SCI investigations, J. Rehabilitation Res. & Dev., v. 42, No. 3, pp. 9-20, May/Jun. 2005.

H. Stephen Kaye, et al., Mobility Device Use in the United States, National Institute on Disability and Rehabilitation Research, U.S. Department of Education, Jun. 2000.

U.S. Census Bureau, S1801 Disability Characteristics, Data Set: 2005-2007 American Community Survey 3-year estimates.

Sociodemographic Characteristics of the Population With Disabilities, pp. 14-15.

Lynn Halverson and Katherine A. Belknap, Fact Sheet on Manual Wheelchairs, ABLEDATA, Jul. 1994, http://www.abledata.com/abledata_docs/manwhch.htm (accessed Jul. 11, 2009).

National Center for Health Statistics, National Health Interview Survey on Disability (NHIS-D), http://www.cdc.gov/nchs/nhis/ad292tb1.htm (accessed Jul. 12, 2009).

* cited by examiner

Section A

Section A-A

SECTION A-A

WHEELCHAIR STABILIZING DEVICE

CROSS REFERENCES

This application claims the benefit of, and priority based upon, U.S. Provisional Patent Application Ser. No. 61/142,890, titled "Wheelchair Stabilizing Device", filed Jan. 6, 2009, the entire disclosure of which is herein incorporated by reference.

This application claims the benefit of, and priority based upon, U.S. Provisional Patent Application Ser. No. 61/152,954, titled "Modified Version of the Wheelchair Stabilizing Device", filed Feb. 16, 2009, the entire disclosure of which is herein incorporated by reference.

This application claims the benefit of, and priority based upon, U.S. Provisional Patent Application Ser. No. 61/263,463, titled "Third Generation of the Wheelchair Stabilizing Device", filed Nov. 23, 2009, the entire disclosure of which is herein incorporated by reference.

This application claims the benefit of, and priority based upon, U.S. Provisional Patent Application Ser. No. 61/264,802, titled "Fourth Generation of the Wheelchair Stabilizing Device", filed Dec. 1, 2009, the entire disclosure of which is herein incorporated by reference.

FIELD OF THE INVENTION

The present invention relates to a wheelchair stabilizing device, and more particularly relates to an apparatus to securely hold a wheelchair in place during the transfer of users, and related methods of use and manufacture.

BACKGROUND

Transferring to and from a wheelchair often results in injurious falls. These injurious falls may happen to physically challenged individuals of all ages who depend on a manual wheelchair for mobility.

In a study in 1994, 1.6 million community dwelling Americans were using a wheelchair for mobility (3), by 2003, 2.2 million community dwelling Americans relied on wheelchairs (4), 2007 there were 3.3 million non-institutionalized wheelchair users (7), and today the numbers continue to climb. In 2003 more than 100,000 wheelchair-related injuries were treated in emergency departments in the US, with trips and falls accounting for 65-80% of the injuries across all age groups (4). A large number of falls involving wheelchairs highlight the problem of unstable manual wheelchairs. There are many devices available to maintain safety while using a wheelchair, including wheelchair locks on the back wheels, safety cushions, anti-tipping devices, and frame modifications (1). Nothing exists for securing the front of a manual wheelchair from moving and preventing the wheelchair from sliding out from under the user during transfers in and out of the wheelchairs. While level transfers, side transfers, and short transfer distances are recommended, and grab bars and transfer boards can help reduce potential falls (5), they do nothing to stabilizing the wheelchair from moving during transfers. The most frequent injuries diagnosed from falls involving wheelchair users are fractures, contusions, lacerations, strains, sprains, and over use of the upper extremities (4). While scrapes, nicks, and bruising are not always avoidable during transfers, when left untreated, can lead to life threatening pressure ulcers, infections, and death.

In the home, there are a variety of situations that can cause falls for wheelchair users during transfers such as: slippery/wet floors during shower transfers, loose rugs, low furniture, furniture that moves easily, lack of handrails/grab bars in bathrooms, uneven floors, slippery floor surfaces (linoleum, laminate flooring, tile, etc.), and non handicapped friendly bathroom and bedrooms (1).

Moreover, many wheelchair users suffer from unpredictable, involuntary muscle spasms. When involuntary muscle spasms occur, they contribute to the difficulty in transferring to and from a manual wheelchair by throwing the user and/or personal care assistant, nurse, nurses' aid, therapist, etc. off balance, causing the wheelchair to tip or move during the violent kicking motion of the legs, causing the user and/or assistant(s) to fall, thereby causing possible injury to one or both of them.

Hospitals and Institutions categorize falls as the largest incidents reported (6), despite devoting enormous amounts of time and money to reduce patient falls. Wheelchair users in the hospital, like all inpatients, whether temporarily or permanently confined to a manual wheelchair, encounter an unfamiliar physical environment, changes in medical conditions, and new medications, all of which puts inpatients and the wheelchair users more at risk for injurious falls, especially during transfers. One example would be hospital rooms that have highly waxed tile floors and beds whose brakes do not lock or do not lock adequately, therefore allowing the bed to slide away from the wheelchair during transfers resulting in falls and possible injury. Another example would be newly paralyzed/amputated wheelchair users, who are unfamiliar and unsure how to transfer to and from a wheelchair safely.

Many designers continue to make wheelchairs lighter in weight, allowing the wheelchair to move more easily out from under the user during transfers and increasing the chances for falls (for example a 23 lb. low, sporty, manual wheelchair and personalized settings that have cambers and tires several inches above the seating area-vs.-a 200 lb individual,) make transfers more unstable and difficult to control while the user tries to lift their heavy paralyzed body up and over the tire to transfer out or to lower the body down into the seat from a higher position to get back in the wheelchair.

Inadequate braking systems on wheelchairs and brakes that are out of adjustment make transferring difficult even in the most ideal situations by allowing the wheelchair to shift or move during transfers. However transferring into and out of a vehicle often takes place in less than ideal weather conditions (uneven surfaces, potholes, wind, rain, sleet, snow, icy surfaces, inclines, declines, wet grass, mud, etc.). The front tires on a manual wheelchair are not equipped with locks/brakes; therefore the self transferring users must rely on the back brakes only to keep the wheelchair in position during transfers.

U.S. Pat. No. 1,635,575 designed in 1926 called a Transfer Device for Invalids has a wheelchair with a back that unlatches and reclines back so as to makes a flat surface between the wheelchair and the hospital bed. The wheelchair back has brackets attached that hook over the hospital bed frame connecting the two together. The invalid is transferred in a prone position across the wheelchair back and onto or out of the bed. The Transfer Device for Invalids does stabilize the wheelchair from moving away from the bed, but the invalid has to have assistance from nursing staff to transfer. Today wheelchairs do not have backs that recline and attach to objects being transferred to and from, possibly due to safety issues, but most important because wheelchair users today want to remain as self sufficient and independent as possible. Moreover, the prior art patent fails to lock the front wheels of the wheelchair.

There is a long-felt, unmet need for a device to secure the wheelchair frame to the object being transferred to or from that prevents the wheelchair from sliding/moving away during transfers, giving the wheelchair user more control in dangerous situations.

Objects of the present invention include to be an important assistive device to prevent a wheelchair from moving out from under a user as they transfer in and out of their wheelchair. Other objects of the present invention include preventing injury from occurring during transfers to and from a wheelchair, injuries not only to the user, but also to the individuals assisting them (Personal Care Attendant, Nurses, Nurses' Aids, Physical Therapists, Family Members, and Friends).

Tips and fall prevention efforts should be our number one priority as they are the leading cause of wheelchair related injuries. The Wheelchair Stabilizing Device will help stabilize wheelchairs by preventing the front end of the wheelchair from rolling away from the object being transferred to or from, and allowing a gap large enough for users to fall into, or if using a transfer board, preventing the transfer board from sliding off the wheelchair or object during transfer, and throwing the individual off balance and possibly onto the floor/ground causing a fall and possibly serious injury.

The Wheelchair Stabilizing Device keeps the wheelchair user as independent and self sufficient as possible, but also gives the personal care assistant, nurse, nurses' aid, therapist, etc. for physically challenged individuals, who need more assistance, an easy, stabilizing, attaching device for faster and safer transfer.

Not only does the Wheelchair Stabilizing Device protect the wheelchair user from falls, but also the Nurses, Nurses' Aids, and Therapists from injuries while assisting them. The Wheelchair Stabilizing Device would give Personal Care Assistants, Nurses, Nurses' Aids, and Therapists better control of the physically challenged individual being transferred to or from a wheelchair, by stabilizing the wheelchair from moving and therefore allowing Personal Care Assistants, Nurses, Nurses' Aids, and Therapists to have both hands on the individual instead of trying to hold the physically challenged individual and the manual wheelchair in place at the same time. During uncontrollable muscle spasms, the Wheelchair Stabilizing Device would keep the wheelchair secured into position preventing it from tipping or moving and allowing the physically challenged individual/personal care assistant, nurse, nurses' aid, or therapist to regain their balance and prevent an injurious fall.

The Wheelchair Stabilizing Device will be cost effective and affordable to all income levels of physically challenged individuals; therefore the wheelchair user could have several of these devices permanently installed throughout their home (on the bed, shower chair, toilet, etc.) and in their vehicle for quicker and safer transfers.

While manual wheelchairs have inadequate braking system and brakes that can be out of adjustment due to loose bolts on the braking levers and worn tires, the Wheelchair Stabilizing Device can not be out of adjustment because it is either attached or not, with such readily and visibly determinable by the physically challenged individuals, personal care assistant, nurses, nurses' aids, physical therapists, family members, and friends to insure the Wheelchair Stabilizing Device is properly hooked/clamped securely before beginning to transfer, further ensuring safer and more controlled transfers and fewer injuries.

Light weight and low sporty models of wheelchairs being designed today; make transferring even more challenging and dangerous for the physically challenged individual, Personal Care Assistants/Nurses/Nurses Aids/Therapists/Family Members, And Friends. The Wheelchair Stabilizing Device would eliminate at least one dangerous situation by stabilizing the wheelchair from moving out from under the physically challenged individual while transferring.

References

The following references are cited by number throughout this disclosure. Applicant makes no statement, inferred or direct, regarding the status of these references as prior art. Applicant reserves the right to challenge the veracity of statements made in these references, which are incorporated herein by reference.

(1) http://www.dhss.rno.gov/InterventionMICA/Injury_From_Falls/older_adults.html
(2) Falls and Fall-Related Injuries in Elderly Nursing Home Residents: Exploring the Person and Environment. Elizabeth E. Hill, PhD, RN http://stti.confex.com/stti/bc39/techprogram/paper_35623.ht
(3) American Journal of Public Health; January, 2002, Vol. 92, No. 1; Wheelchair Users at Home: Few Home Modifications and Many Injurious Falls. Katherine Berg, PhD, PT; Marilyn Hines, BA; Susan Allen, PhD.
(4) Wheelchair Related Injuries in US Emergency Departments. Injury Prevention 2006; 12; 8-11. H. Xiang, A-M Chany, and G A Smith. doi:10.1136/ip.2005.010033
(5) Secondary Injury Prevention and Farming From a Wheelchair The National AgrAbility Project Staff. 2006-2007
(6) Nurses' Solution to Prevent Inpatient Falls In Hospital Rooms. Nur. Econ. 2008; 26 (3): 179-187 2008 Jannetti Publications, Inc. Posted Aug. 11, 2008 Huey-Ming Tzeng, PhD, RN; Chang-Yi Yin, M A http://www.medscape.com/viewarticle/576954 print
(7) 2007 Disability Status Report: United States Cornell University www.disabilitystatistics.org
(8) Wheelchair Use in the United States Disability Statistics Center Abstract 23 May 2002 http://dsc.ucsf.edu/publication.php H. Stephen Kaye, Taewoon Kang, and Mitchell P. LaPlanta
(9) Health, United States 2008 32nd Annual Report by the Sec. of the Dept. of Health and Human Services for the President and Congress
(10) Home Care Oct. 1, 2002 OPEN DATES by Marjory Garrison http://license.icopyright.net/user/viewFree Use.act? fluid=NDEwODc5OO53D53D
(11) Disability and Health in the United States, 2001-2005 U.S. Department of Health and Human services July 2008 DHHS Publication No. (PHS) 2008-1035
(12) U.S. Pat. No. 1,635,575

SUMMARY

According to one aspect, a wheelchair stabilizing device is provided. The wheelchair stabilizing device includes a latch, a mounting bracket and a swing arm. The latch is connected at one end of the swing arm while the mounting bracket is connected to the opposite end of the swing arm. The latch includes at least two opposing latch arms. The latch has an open-position and a closed-position and is spring-biased in the closed position. The swing arm may be rotated between an engaged position in which the latch may be used to stabilize a wheelchair and a disengaged position so that it is out of the way. At least one of the two opposing latch arms includes a curved latch arm tip that curves back toward the swing arm and mounting bracket. The latch arm tip curves so as to provide at least a partial enclosure. The tip of at least one of the latch arms is curved such that the latch is forced into the open-position when pressure is applied. In some embodiments, the swing arm includes a variable length extendable shaft, optionally spring-biased to the shortest length. In some embodiments, the variable length extendable shaft includes a series of preset lengths at which the shaft may be temporarily secured. In some embodiments, the latch is connected to the swing arm via a swivel connection. In some embodiments, a compression spring is used to spring-bias the latch in the closed position, while a tension spring is used in other embodiments. In some embodiments, the latch includes three arms, with two being sized and shaped substantially similar to each other and in alignment with each other, while the third opposes and is sandwiched between the other two.

According to a second aspect, a method of using a wheelchair stabilizing device is provided. The method of use includes (a) rotating the latch to the engaged position if it is in the disengaged position; (b) applying pressure at the end of the latch with a rod or bar such that the latch is forced into the open-position sufficient to securely hold the rod or bar in the at least partial enclosure or until the latch returns to the closed-position with the rod or bar securely held between the opposing latch arms; and (c) moving the latch to the open-position and retaining the latch in the open position while removing the rod or bar from between the two opposing latch arms. In some embodiments, the method further includes transferring a user to or from a wheelchair that has been stabilized by the rod or bar securely held in the at least partial enclosure or between the opposing latch arms. In some embodiments, the method further includes rotating the latch to the disengaged position after transfer of the user has been completed.

According to a third aspect, a method of manufacturing a wheelchair stabilizing device is provided. The method of manufacturing includes attaching the latch arms to the swing arm and attaching the mounting bracket to the swing arm. In some embodiments, the method further includes inserting a spring between the latch and the swing arm such that the latch is spring-biased in the closed-position. Compression or tension springs may be used depending on the configuration of the pieces.

The wheelchair stabilizing device and associated methods may be adapted for many different applications by changing the mounting bracket to accommodate different styles and designs of wheelchairs, bed frames, shower chairs, toilets, automobiles, etc.

Some embodiments will now be described in conjunction with the accompanying drawings.

BRIEF DESCRIPTION OF THE DRAWINGS

For the purpose of illustration, forms of the invention which are presently preferred are illustrated in the drawings; it being understood, however, that this invention is not limited to the precise arrangements and instrumentalities illustrated. In the drawings.

DETAILED DESCRIPTION

Figure 1:
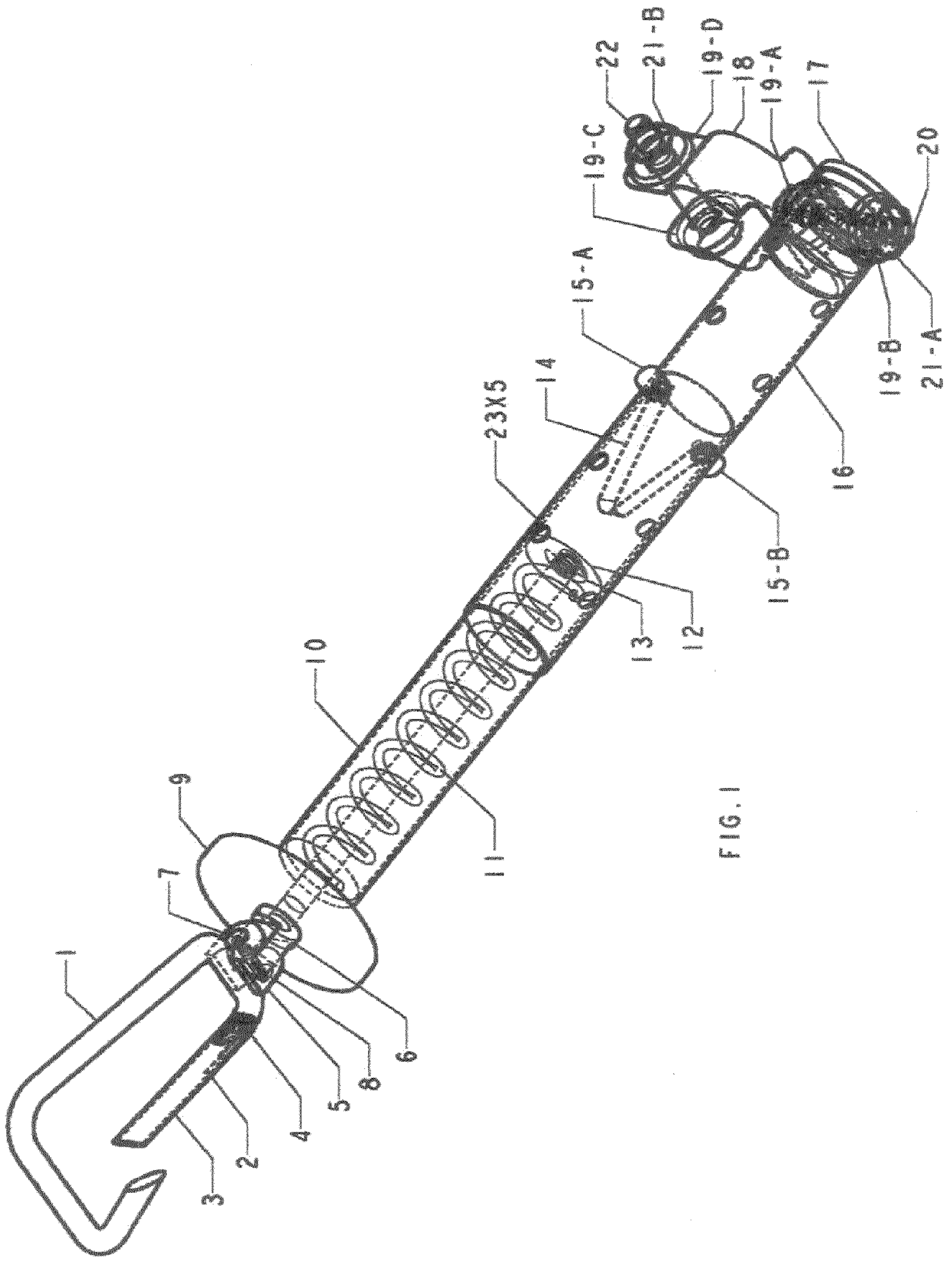
FIG. 1. is a perspective view of a first embodiment of the wheelchair stabilizing device.
Figure 4:
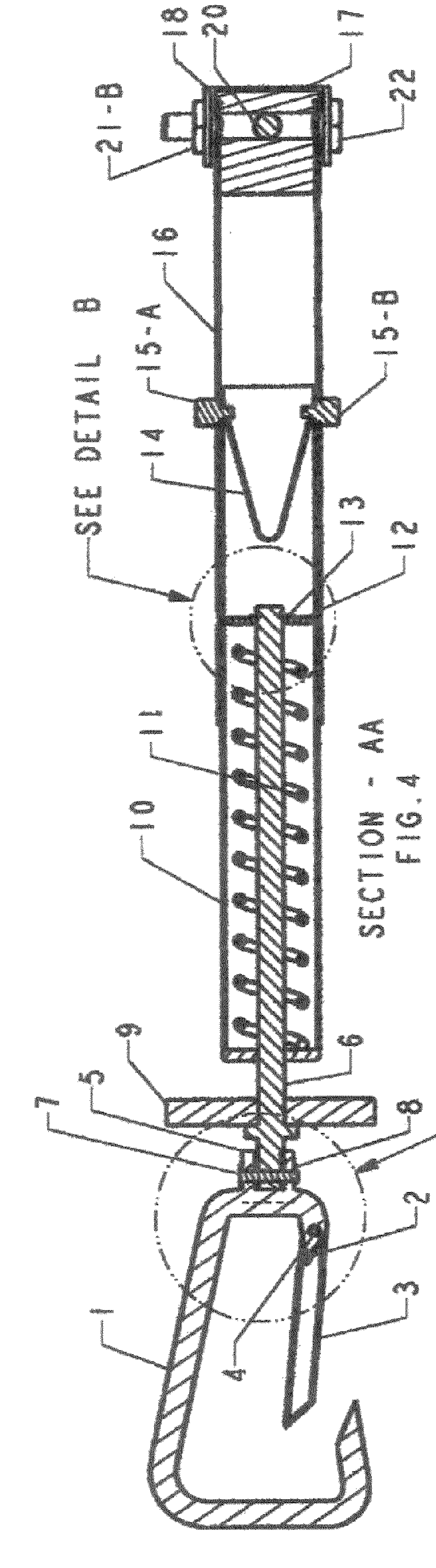
FIG. 4. is a cross-section of the device of FIG. 1 along the AA-plane illustrated in FIG. 2.
Figure 2:
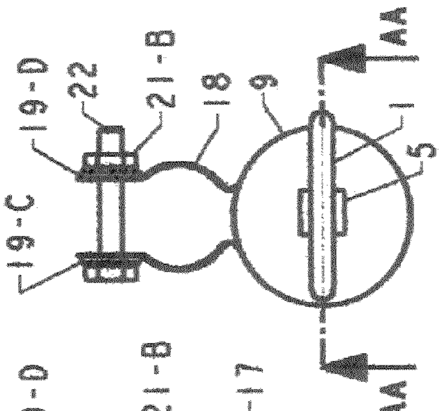
FIG. 2. is an end view of the device of FIG. 1.
Figure 3:
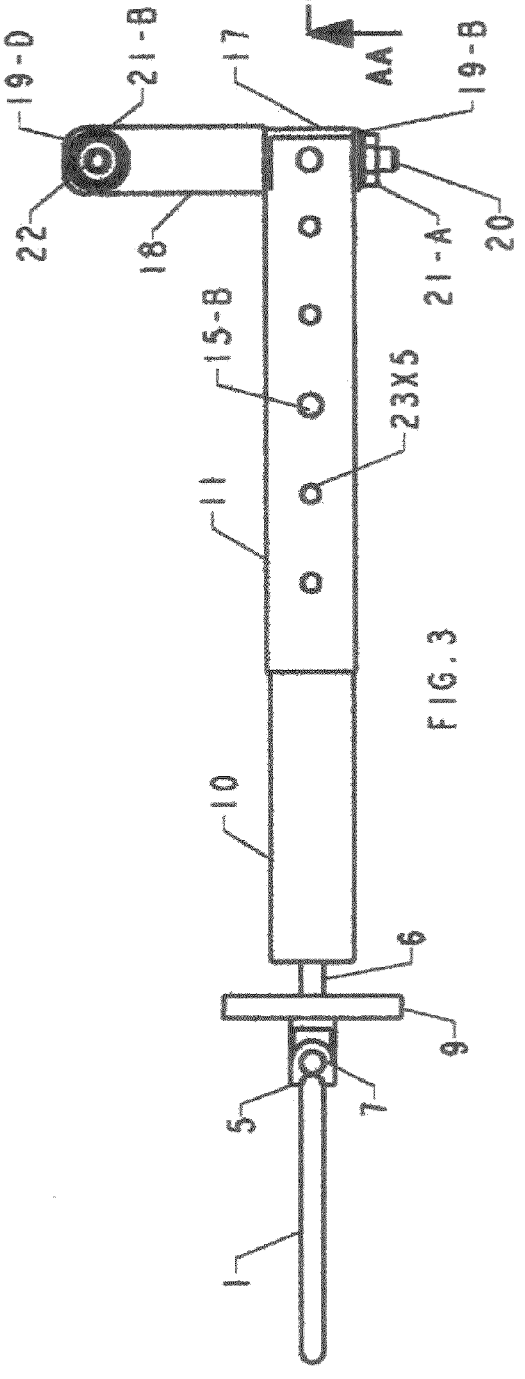
FIG. 3. is a side view of the device of FIG. 1.
Figure 6:
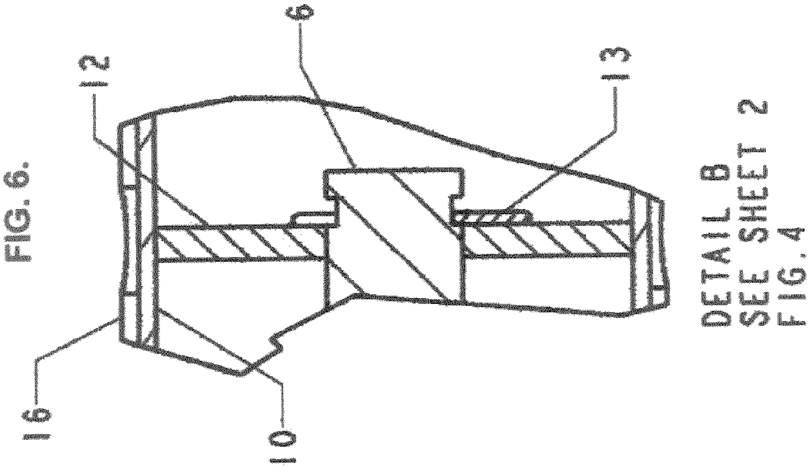
FIG. 6. is a detailed view of section B illustrated in FIG. 4.
Figure 5:
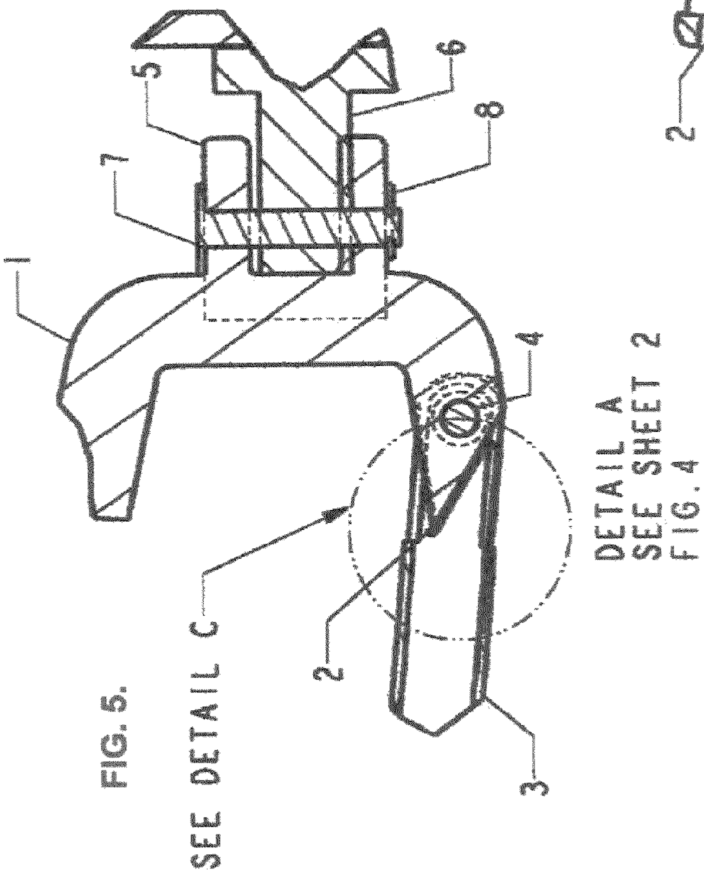
FIG. 5. is a detailed view of section A illustrated in FIG. 4.
Figure 7:
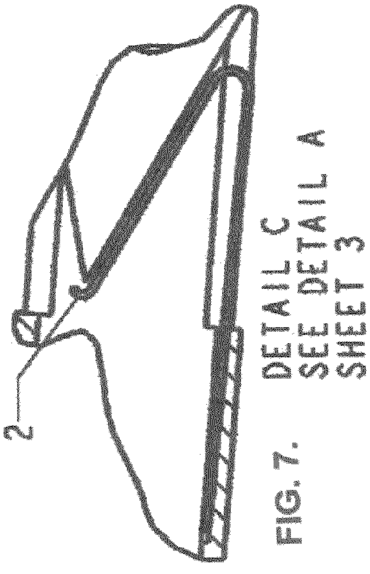
FIG. 7. is a detailed view of section C illustrated in FIG. 5.

Referring to the accompanying Drawings, FIGS. 1-7 represent a first embodiment of the wheelchair stabilizing device. The device of FIGS. 1-7 is constructed to stabilize a wheelchair during transfers to and from. FIG. 1 is a perspective view of the first embodiment. FIG. 2 is an end view. FIG. 3 is a side view. FIG. 4 is a cross-section of the device of FIG. 1 along the AA-plane illustrated in FIG. 2. FIG. 5 is a detailed view of section A illustrated in FIG. 4. FIG. 6 is a detailed view of section B illustrated in FIG. 4. FIG. 7 is a detailed view of section C illustrated in FIG. 5. The embodiment illustrated in FIGS. 1-7 is attached to the frame of a wheelchair at one end (either the latch or the mounting bracket) and attached to an attachment bar or other stabilizing object at the opposite end, securing the wheelchair from moving out from under the user during transfers.

As illustrated in FIGS. 1-7, a mounting bracket 18 is installed in or on an object such as a bed, toilet, shower chair, hospital bed, wheelchair, therapy table, automobile, etc. At the end opposite the mounting bracket 18, the latch includes two opposing latch arms 1 and 3. The latch is illustrated in the open-position in FIGS. 1-7, however, the latch spring 2 and hinge pin 4 spring-bias the latch in the closed-position. The latch arm 1 includes a tip that curves back in the direction of the swing arm 10 and the mounting bracket 18. This creates a partial enclosure between the two latch arms 1 and 3. Much like a climber's carabineer, the spring-bias closed latch may be opened simply by applying force where the two latch arms 1 and 3 meet.

The latch is connected to the mounting bracket 18 via the swing arm 10. The swing arm 10 rotates between an engaged position and a disengaged position. In the engaged position, the latch may be used to securely hold a wheelchair in place. In the disengaged position, the latch is removed out of the way, for storage, for example.

The embodiment illustrated in FIGS. 1-7 also includes a variable length extendable shaft. The swing arm 10 includes an extension rod 6 which may be metal or non-metal, preferably plastic or steel. A coil spring 11 biases the variable length extendable shaft to the shortest position. The extension rod 6 may be extended to increase the length of the variable length extendable shaft. The variable length extendable shaft may be temporarily secured at certain preset lengths by inserting adjustable buttons 15A and 15B into predrilled holes in the shaft.

The embodiment illustrated in FIGS. 1-7 also includes a latch that connects to the swing arm 10 via a swivel connection 5. The swivel connection 5 includes swivel pin 7 and locking feature 8. The swivel connection 5 allows the user to turn the latch in any direction needed to easily and securely attach it to the wheelchair frame or other stabilizing frame. To more easily connect and/or disconnect the latch arm 1 from the wheelchair, a circular disk 9 is placed on the extension rod 6 between the swing arm 10 and the swivel connection 5. The user can use the circular disk 9 for leverage to push the latch arm 1 forward to attach or remove the latch arm 1 from the wheelchair frame or other stabilizing frame.

The two piece variable length extendable shaft swing arm 10 is adjustable to allow the Wheelchair Stabilizing Device to be mounted on multiple frame designs. The extension rod 6 runs through the interior of the swing arm 10 and through the center of a coil spring 11. The coil spring 11 is held in place by a metal mechanism 12 and a lock 13. The compressed tension of the coil spring 11, when the Wheelchair Stabilizing Device is properly installed connecting a wheelchair and an object, holds the wheelchair up against the object, and stabilizes the wheelchair from moving out from under the user, therefore preventing injury to the user or assistants. The swing arm 10 houses a spring clip 14 with two adjustment buttons 15A and 15B, attached to either end of spring clip 14, and at the end of the swing arm 10. The two adjustable buttons 15A and 15 B, when lined up with the two through holes drilled at the end of the swing arm 10, extend outward through the two through holes, and are used to lock the variable length extendable shaft swing arm 10 into preset lengths.

A protective plug 17 is placed in the end of the outer swing arm 16, opposite the end with the latch, to protect the user from being cut or scraped on any sharp edges of the outer swing arm 16 during installation or removal of the Wheelchair Stabilizing Device's mounting bracket 18. The plug 17 protects the physically challenged individual from dangerous cuts and infections in an already compromised immune system. The end of the outer swing arm 16 and the plug 17 has two through holes drilled and spaced perpendicular to each other, allowing the mounting bracket 18 to be attached in four different positions to accommodate multiple style/designs of shower chairs, beds, therapy tables, hospital beds, toilets, wheelchairs, vehicles, or other stabilizing objects. The mounting bracket 18 is attached to the end of the outer swing arm 16 by placing a mechanism 19A on Bolt 20, threading Bolt 20 through the bottom manufactured hole on mounting bracket 18 and through one set of through holes located near the end of the outer swing arm 16 and the plug 17. Another mechanism 19B and Fastener 21A is then placed on the end of Bolt 20 and tighten. This firmly fixes the mounting bracket 18 to the outer swing arm 16. The clamp end of the mounting bracket 18 is placed around a section of the frame or rail of a bed, shower chair, toilet, hospital bed, therapy tables, wheelchair, or other stabilizing object in such a way as to be securely fastened in place by fixing another mechanism 19C over Bolt 22, threading bolt 22 through the two manufactured holes on the clamp ends of the mounting bracket 18, placing a mechanism 19D over the end of bolt 22, and tightening the clamp in place with a Fastener 21B. The wheelchair Stabilizing Device is now securely fastened to the object being transferred to or from.

When the latch arm 1 is placed securely over the frame of the wheelchair/vehicle attaching means, the user is ready to transfer safely without fear of the wheelchair moving out from under the user, therefore preventing injurious falls to the user. The wheelchair Stabilizing Device also protects assistants and caregivers from possible injury as he/she will have both hands free to assist the physically challenged individual during transfers by not having to hold the wheelchair in place with one hand and assisting the transfer of an unstable user with one free hand.

The Wheelchair Stabilizing Device would be very beneficial in a hospital/institutional setting because the Wheelchair Stabilizing Device could be permanently attached to the hospital/institutional beds allowing transfers to be accomplished by one Nurse/Nurse's Aid rather than by the normal two person assist used in most hospitals and institutions. A two person Assist is where each person is using one hand to hold the wheelchair in place and the other hand is used to maneuver the physically challenged individual during a transfer.

As illustrated in FIG. 2, the latch arm 1, the swivel connection 5, the circular disk 9, a view of the mounting bracket 18 secured in one position on the outer swing arm 16 below the circular disk 9, and how it is held securely in place after placing the two clamp ends of the mounting bracket 18 around the frame of a wheelchair or other stabilizing object. After placement of the mounting bracket 18 over the frame, a mechanism 19C is placed on Bolt 22, threading bolt 22 through the clamp end holes, adding another mechanism 19D and tightening the mounting bracket 18 in place with Fastener 21B. As can be seen in FIG. 2, the mounting bracket 18 can be easily installed or removed as needed by the user.

As illustrated in FIG. 3, the latch arm 1 is connected to the swivel connection 5. The Swivel Pin 7 connects the extension rod 6 to the bottom shaft of the swivel connection 5, allowing the latch arm 1 to be turned around 360 degrees and moved up and down as needed to easily connect or disconnect the latch arm 1 to or from the wheelchair frame or other stabilizing object. A circular disk 9 is placed on the extension rod 6 between the swivel connection 5 and the swing arm 10 to give the user leverage to more easily attach to or remove the latch arm 1 from the wheelchair frame or other stabilizing object. The end of the swing arm 10 is dome shaped just under the circular disk 9 for safety purposes to prevent injury when extending and releasing the latch arm 1 from the wheelchair frame or other stabilizing object. The swing arm 10 and outer swing arm 16 and the placement of a row of Adjustable Through Holes 23×5 in the outer swing arm 16, allows the swing arm 10 and outer swing arm 16 to be lengthened or shortened as needed by pressing the spring loaded Adjustable Button 15A and 15B, housed inside the swing arm 10 and extending out through a hole at the end of the swing arm 10, and extending out and locking into one of Adjustable Through Holes 23×5 on the outer swing arm 16. For safety purposes an aesthetically pleasing plug 17 is placed in the end of the outer swing arm 16.

The mounting bracket 18 is used to secure the Wheelchair Stabilizing Device to a bed, shower chair, toilet, hospital bed, wheelchair therapy table, vehicle, or other stabilizing object. FIG. 3 illustrates the placement of the mounting bracket 18 through the end of outer swing arm 16 and the plug 17 using Bolt 20, a mechanism 19B, and fastener 21A. Also illustrated in FIG. 3 is the mounting bracket 18 clamping end and how it is fastened in place using Bolt 22, a mechanism 19D, and tightening the fastener 21B.

FIG. 3 illustrates the simplicity of this invention both for manufacturing purposes and for the operation of the Wheelchair Stabilizing Device by the user. Because of its simple design and low cost of manufacturing, the device will be affordable to all income levels of physically challenged individuals, hospitals, and institutions. The physically challenged individual will be able to afford more than one Wheelchair Stabilizing Device so that one device can be permanently attached to each bed, shower chair, toilet, and wheelchair, making transfers safer and faster, and allowing the physically challenged individual to remain as independent and self-sufficient as possible. It is expected the Medicare/Medicaid Organizations will see the value of this invention and make the Wheelchair Stabilizing Device Medicare/Medicaid approved.

FIG. 5 illustrates the placement of the V shaped latch spring 2 incased inside the latch arm 3. The Latch Spring 2 has a hook on one end that hooks over the angled end of the latch arm 1 during insertion into the bottom opening of the latch arm 3. The latch arm 3 and the latch arm 1 are then connected together with Hinge Pin 4 which also holds the Latch Spring 2 in place. Hinge Pin 4 and the Latch Spring 2 allow the latch arm 3 to be opened and closed manually by the user. The latch arm 3 is a safety device preventing the hook from slipping off the wheelchair frame during transfers. The latch spring 2 closes the latch and holds it closed until the latch is manually opened once transfer is complete. The latch spring 2 tension is only strong enough to hold the latch closed, but is easily opened by the user for quick removal of the hook from the wheelchair frame or other stabilizing object when transfer is complete. The latch arm 1 and the latch arm 3 are plastic coated, metal cores, to prevent slippage once the latch arm 1 is placed over the wheelchair frame to further prevent the wheelchair from moving during transfers.

FIG. 6 illustrates the end of the extension rod 6 and the placement of a mechanism 12 and a lock 13. The purpose of the mechanism 12 and the lock 13 is to hold the Coil Spring 11 on the extension rod 6. When latch arm 1 is extended the Coil Spring 11 is compressed against the mechanism 12 and the top end of the swing arm 10. Once the latch arm 1 is placed over the wheelchair frame or other stabilizing object, the Coil Spring 11 holds the wheelchair in place during transfer and prevents the user from falling and from possible injury.

FIG. 7 illustrates the position of the Latch Spring 2 inside the latch arm 3 and the small hook on one end of Latch Spring 2 in relationship to the angled end of the latch arm 1.

Figure 8:
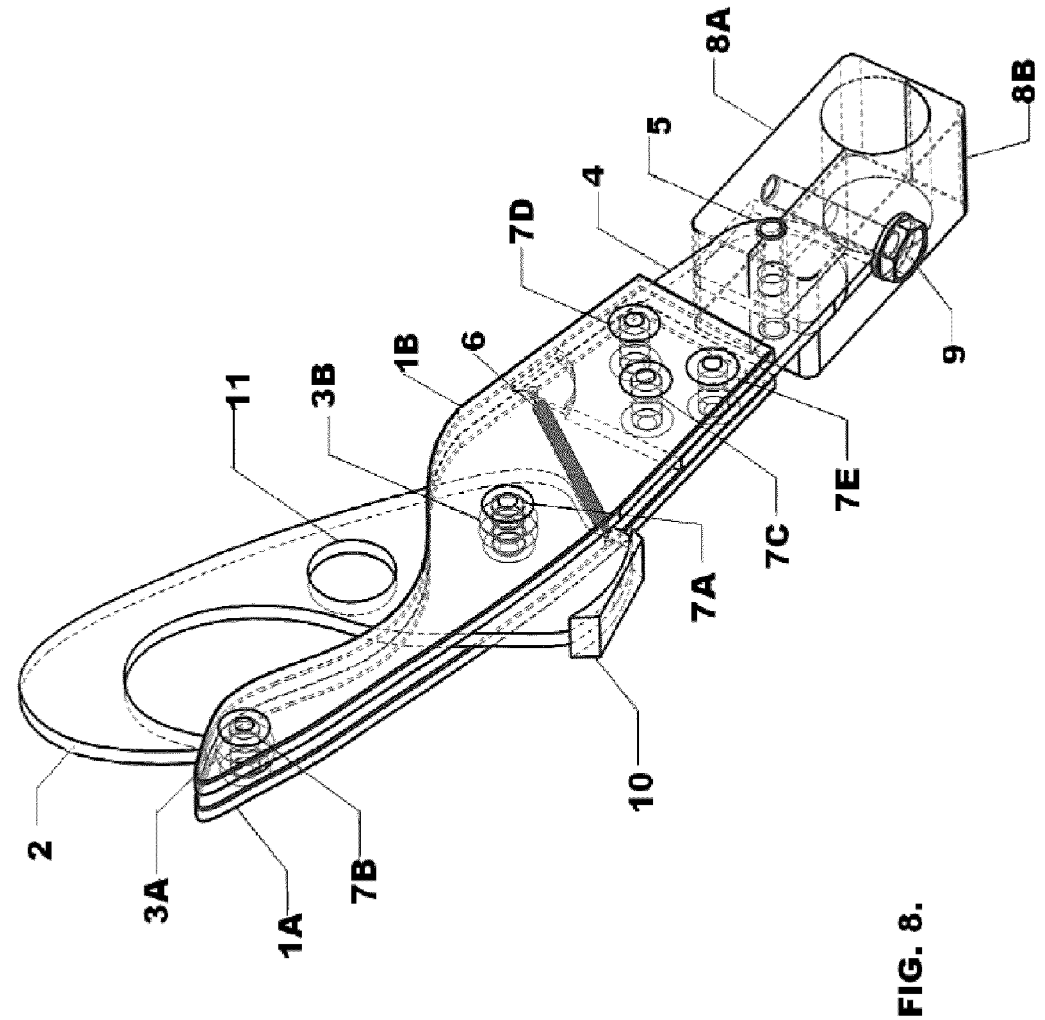
FIG. 8. is a perspective view of a second embodiment of the wheelchair stabilizing device.
Figure 10:
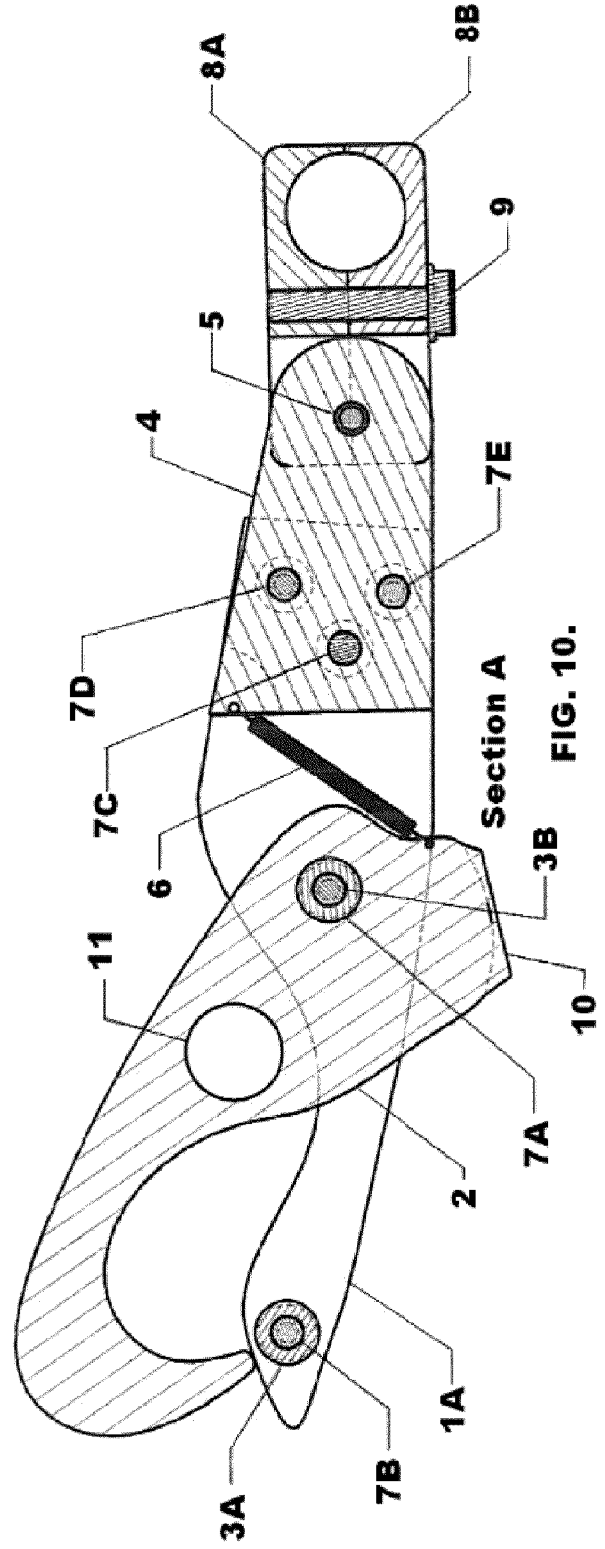
FIG. 10. is a cross-section of the device of FIG. 8 along the A-plane illustrated in FIG. 9.
Figure 9:
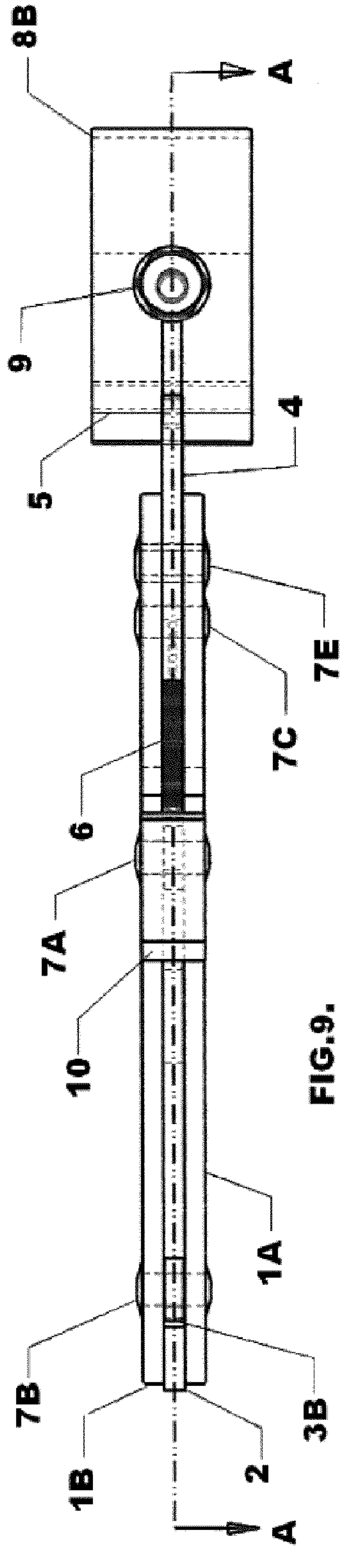
FIG. 9. is a is a top view of the device of FIG. 8.
Figure 11:
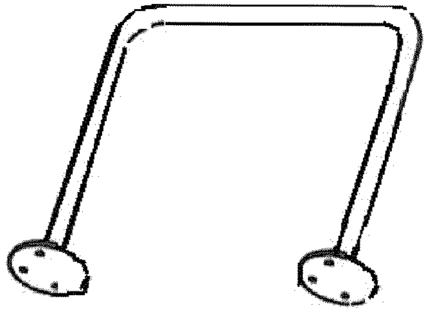
FIG. 11. is a perspective view of an attachment bar for use with any of the wheelchair stabilizing device embodiments.
Figure 12:
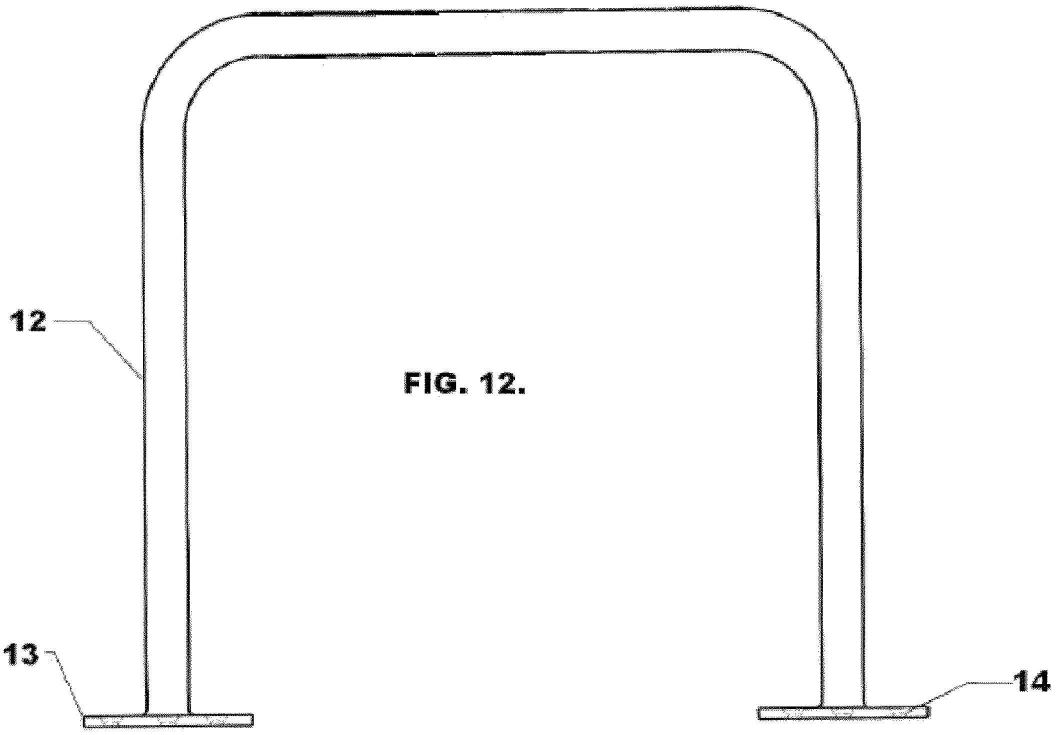
FIG. 12. is a side view of the attachment bar of FIG. 11.
Figure 13:
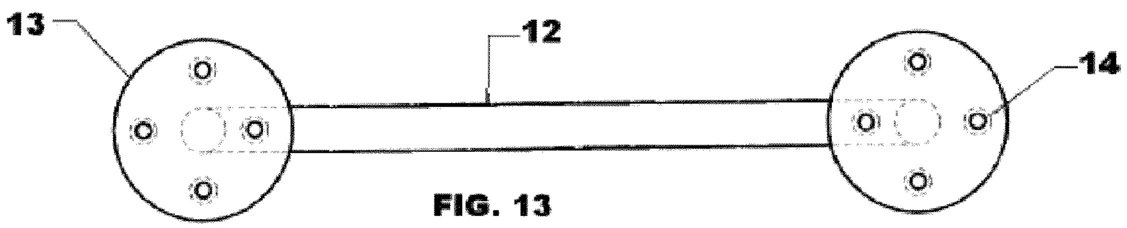
FIG. 13. is an end view of the attachment bar of FIG. 11.
Figure 14:
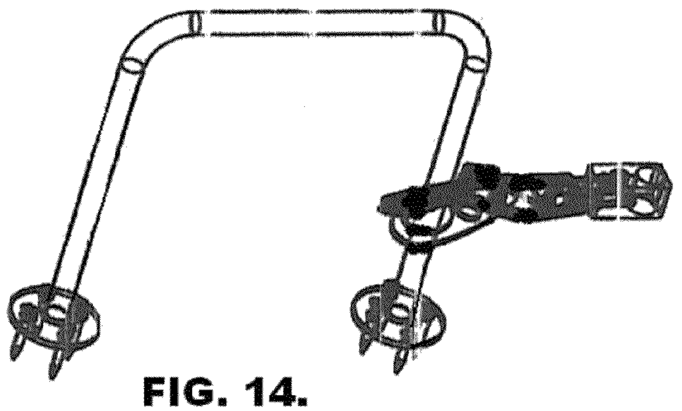
FIG. 14. is a perspective view of the attachment bar of FIG. 11 with the device of FIG. 8 illustrated attached.
Figure 15:
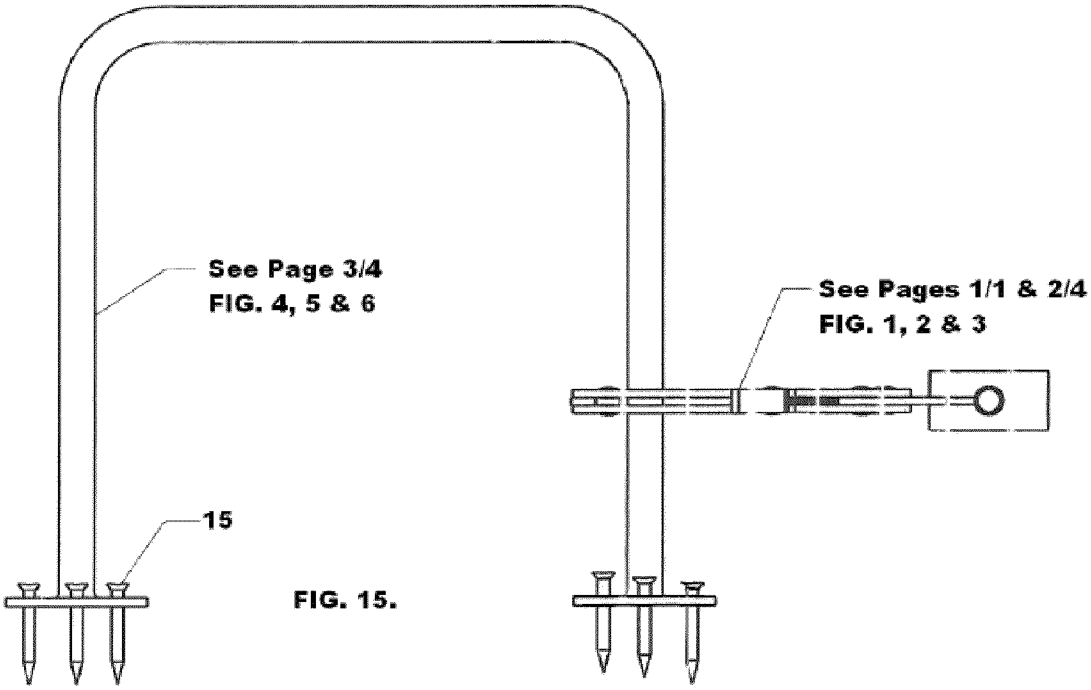
FIG. 15. is a side view of the attachment bar of FIG. 11 with the device of FIG. 8 illustrated attached.

FIGS. 8-15 represent a second embodiment of the wheelchair stabilizing device. FIG. 8 is a perspective view of a second embodiment of the wheelchair stabilizing device. FIG. 9 is a is a top view of the device of FIG. 8. FIG. 10 is a cross-section of the device of FIG. 8 along the A-plane illustrated in FIG. 9. FIG. 11 is a perspective view of an attachment bar for use with any of the wheelchair stabilizing device embodiments. FIG. 12 is a side view of the attachment bar of FIG. 11. FIG. 13 is an end view of the attachment bar of FIG. 11. FIG. 14 is a perspective view of the attachment bar of FIG. 11 with the device of FIG. 8 illustrated attached. FIG. 15 is a side view of the attachment bar of FIG. 11 with the device of FIG. 8 illustrated attached.

The Wheelchair Stabilizing Device illustrated in FIGS. 8-15 is assembled by placing fasteners 7A, 7B, 7C, 7D, and 7E through the holes along latch arm 1A. Spacers and/or Bushings 3A & 3B are placed over fasteners 7A & 7B. A medium size hole in the latch arm 2 is placed down over Spacer and/or Bushing 3B and fastener 7A. The squared end of the swing arm 4 is placed over fasteners 7C, 7D, & 7E. A Tension Spring 6 is hooked in a small hole in the latch arm 2 and the small hole in the squared end of the swing arm 4. The latch arm 1B is placed down over all fasteners and tightened securely into place. The swing arm 4 has a rounded end extending out beyond the latch arms 1A and 1B with a through hole. Hinge Pin 5 is placed through the hole on the rounded end of the swing arm 4. The Hinge Pin 5 and rounded end of the swing arm 4 is placed in the precut horizontal slot and the parallel through hole on one end of the Mounting Bracket 8A & 8B. The clamping ends of the Mounting Bracket 8A & 8B are placed around the wheelchair frame or other stabilizing object and fastener 9 fastens the entire unit securely to the wheelchair or other stabilizing object.

The rounded end of swing arm 4 and Hinge Pin 5 allows the user to swing the Wheelchair Stabilizing Device to a disengaged position that is close to the frame and out of the way when not in use. When ready to use the user swings the Wheelchair Stabilizing Device out to an engaged position, rolls up to a stabilizing object, and applies pressure against latch. The pressure from the stabilizing object against the latch opens the latch arm 2 and then the Tension Spring 6 securely closes the latch arm 2 around the stabilizing object. When transfer is completed, the user can use the Thumb Release 10 or the Finger hole 11 to open the latch arm 2 and unhook the Wheelchair Stabilizing Device from the stabilizing object.

FIGS. 9-10 show the placement of latch arms 1A, 1B and 2, Spacer/Bushing 3A, and fastener 7B. The latch arm 2 has a through hole placed over Spacer/Bushing 3B, and fastened in place by fastener 7A. The Thumb Release 10 is in full view. Fastened to one corner of the latch arm 2 is the Tension Spring 6 with the other end of the Tension Spring 6 fastened to the opposite corner of the swing arm 4. Swing arm 4 is sandwiched in between latch arms 1A and 1B and fastened together with fasteners 7C, 7D, & 7E. The swing arm 4 extends out from between the latch arms 1A & 1B and has a rounded end with a through hole. The rounded end of the swing arm 4 is inserted into a horizontal slot cut in the Mounting Bracket 8A & 8B and lined up with the vertical through hole drilled in the Mounting Bracket 8A & 8B. Hinge pin 5 is inserted down through the vertical hole and through the hole in the swing arm 4. The Clamping end of the Mounting Bracket 8A & 8B is clamped around the frame of a wheelchair or other stabilizing object and fastened securely into place with fastener 9.

FIGS. 11-15 show an attachment bar 12 that may be secured to a floor, bed frame, chair, therapy table, hospital/institutional bed, vehicle or a variety of other objects. The Wheelchair Stabilizing Device may easily hook on to this attachment bar 12, as illustrated in FIGS. 14 and 15. The attachment bar 12 is preferably a U-shaped, aluminum, tubular, steel rod with predrilled holes 14 end for mounting on various surfaces. The attachment bar 12 may be used in conjunction with any of the embodiments of the Wheelchair Stabilizing Device.

Figure 16:
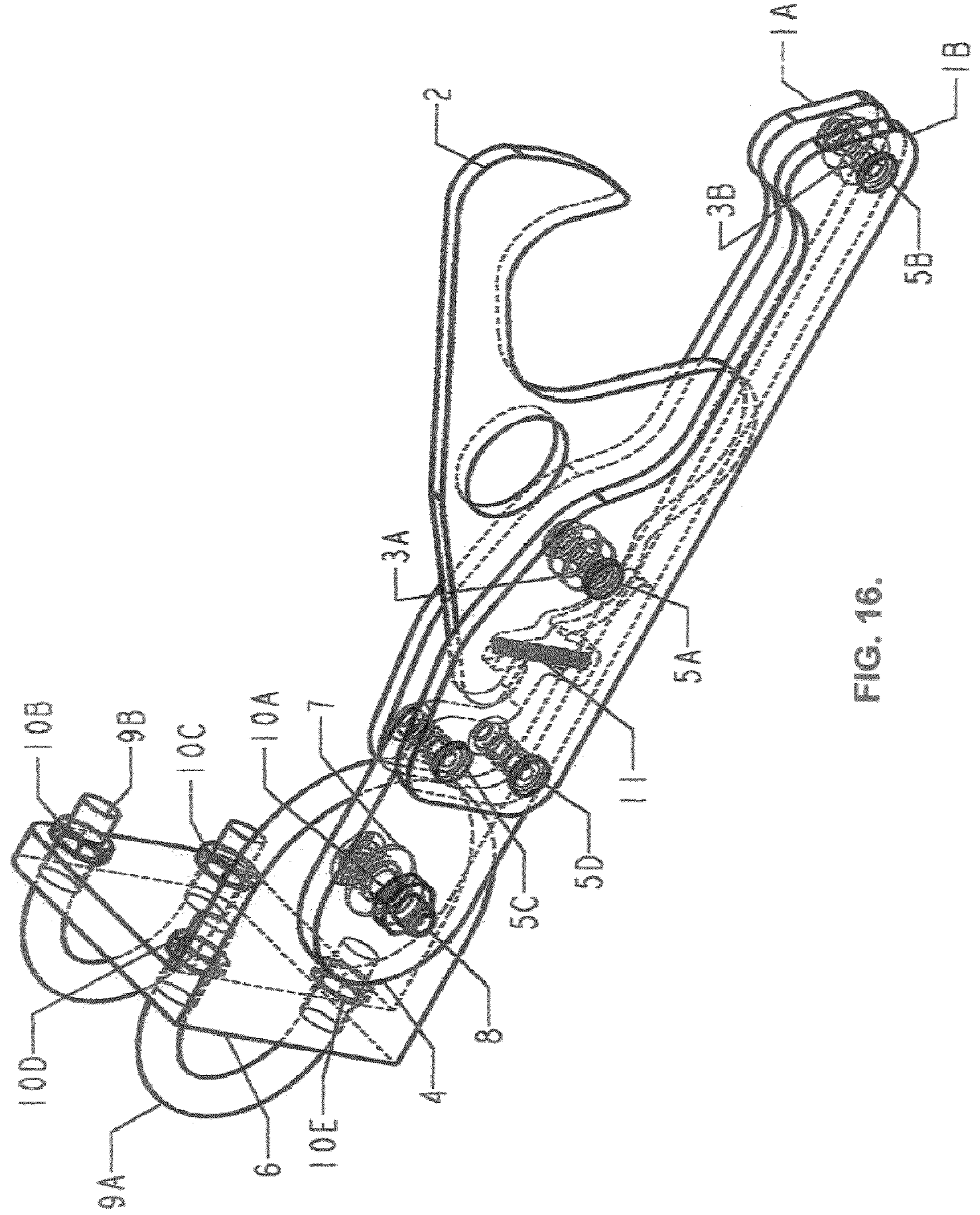
FIG. 16. is a perspective view of a third embodiment of the wheelchair stabilizing device.
Figure 17:
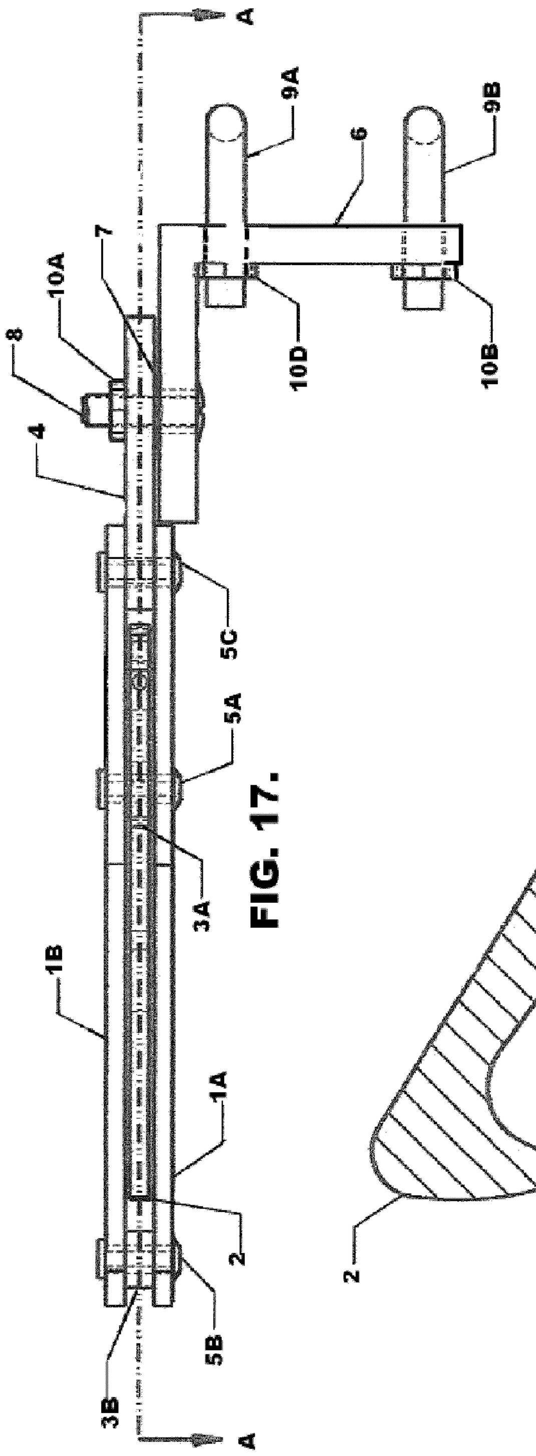
FIG. 17. is a top view of the device of FIG. 16.
Figure 18:
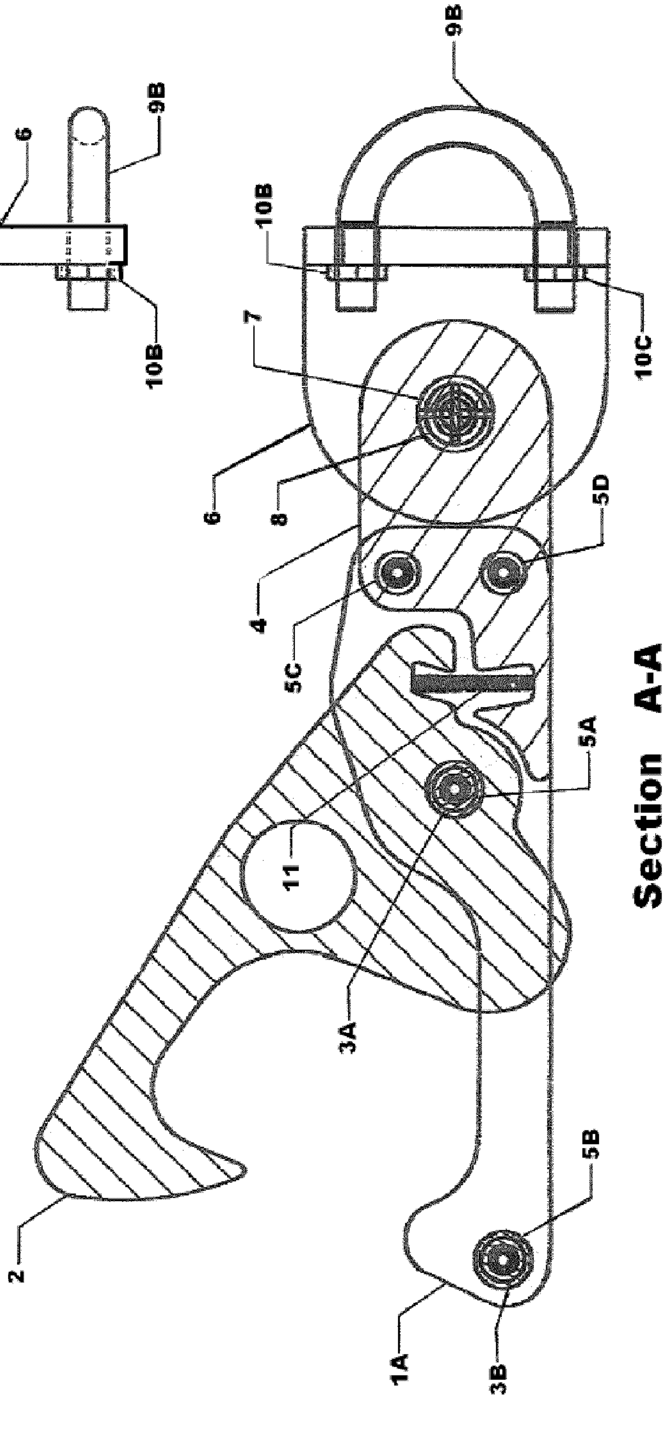
FIG. 18. is a cross-section of the device of FIG. 16 along the A-plane illustrated in FIG. 17.

FIGS. 16-18 represent a third embodiment of the wheelchair stabilizing device. FIG. 16 is a perspective view of a third embodiment of the wheelchair stabilizing device. FIG. 17 is a top view of the device of FIG. 16. FIG. 18 is a cross-section of the device of FIG. 16 along the A-plane illustrated in FIG. 17.

The wheelchair stabilizing device of FIGS. 16-18 is assembled in a manner similar to that of the embodiment discussed above with respect to FIGS. 8-15, however, the embodiment illustrated in FIGS. 16-18 uses a compression spring 11 between the swing arm 4 and the latch arm 2, rather than using a tension spring as illustrated in FIGS. 8-15.

The device illustrated in FIGS. 16-18 also includes a mounting bracket 6 that is different from the mounting bracket illustrated in FIGS. 8-15. In FIGS. 16-18, the mounting bracket 6 is L-shaped. A fastener 8 is placed through the single through hole in the mounting bracket 6, through a spring washer, and through the single through hole on the rounded end of the swing arm 4. The assembly is locked into place with a locking device 10A. The opposite side of the L-shaped mounting bracket 6 includes four through holes drilled evenly spaced and parallel to each other. As illustrated, U-bolts 9A and 9B are placed through the holes either parallel or horizontal as needed to mount the mounting bracket 6 to a wheelchair, attachment bar or other stabilizing object. Locking devices 10B and 10D are used to secure the mounting bracket 6 in place. The mounting bracket 6 may be mounted on either side of the swing arm 4 as needed to accommodate different styles of wheelchairs, bed frames, shower chairs, vehicles, attachment bar, or other stabilizing objects.

Figure 19:
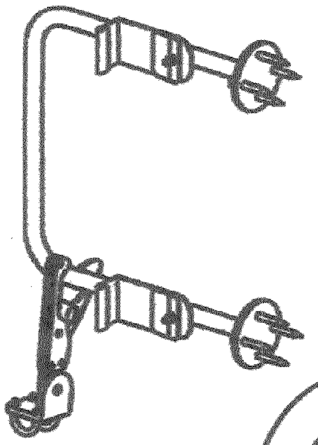
FIG. 19. is a perspective view of the attachment bar of FIG. 11, including optional mounting brackets, with the device of FIG. 16 illustrated attached.
Figure 20:
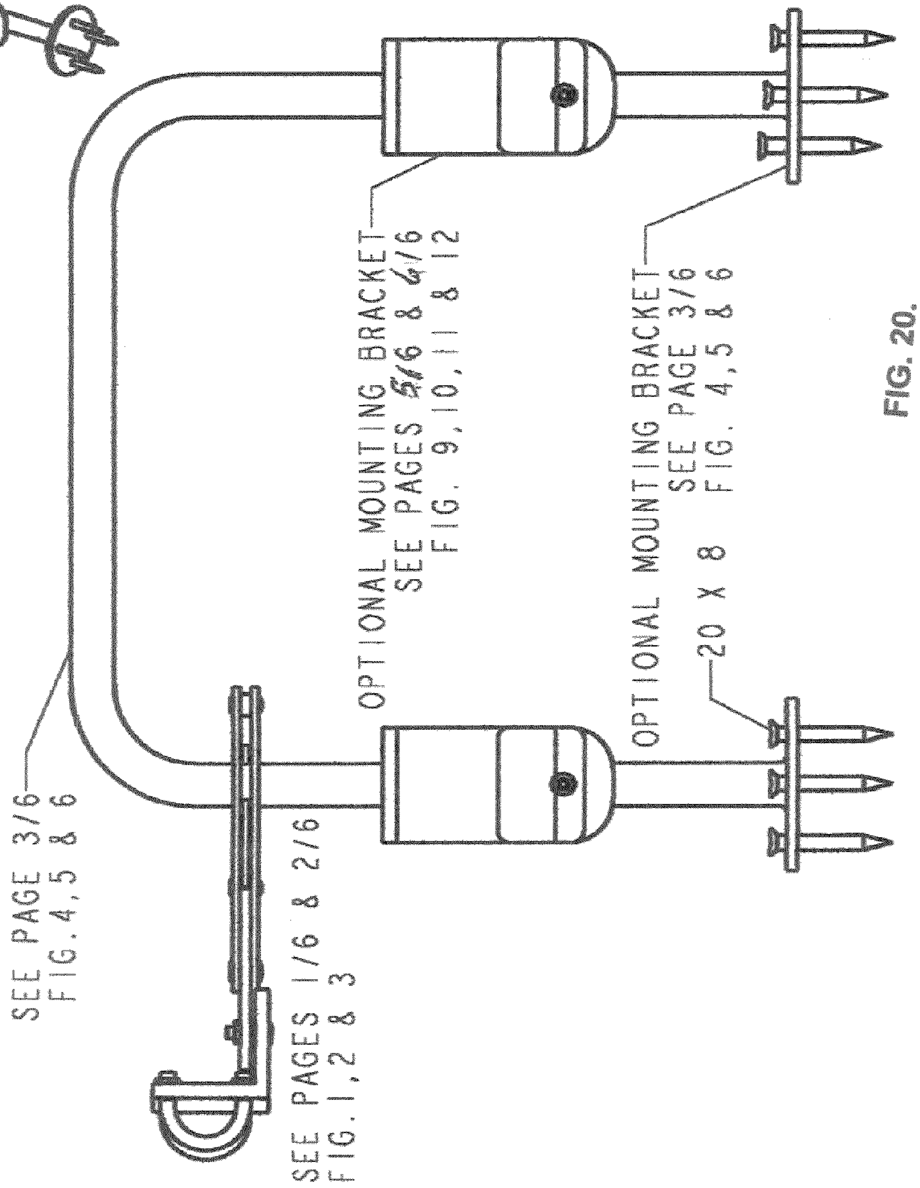
FIG. 20. is a side view of the attachment bar of FIG. 19 with the device of FIG. 16 illustrated attached.
Figure 21:
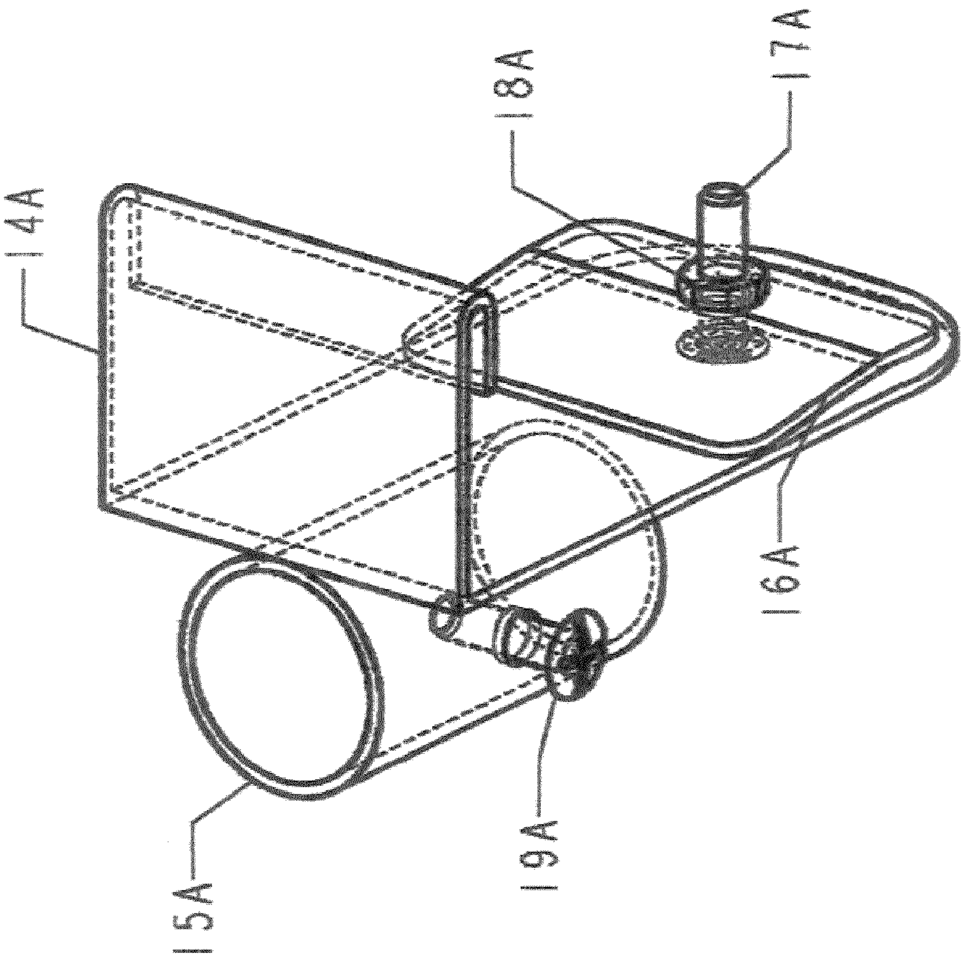
FIG. 21. is a perspective of the optional mounting brackets illustrated on the attachment bar in FIG. 19.
Figure 24:
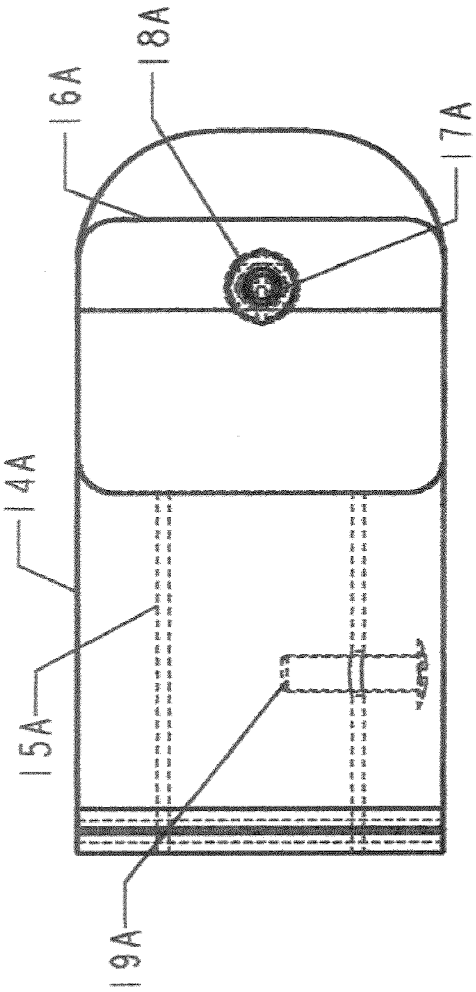
FIG. 24. is a top view of the mounting bracket of FIG. 21.
Figure 23:
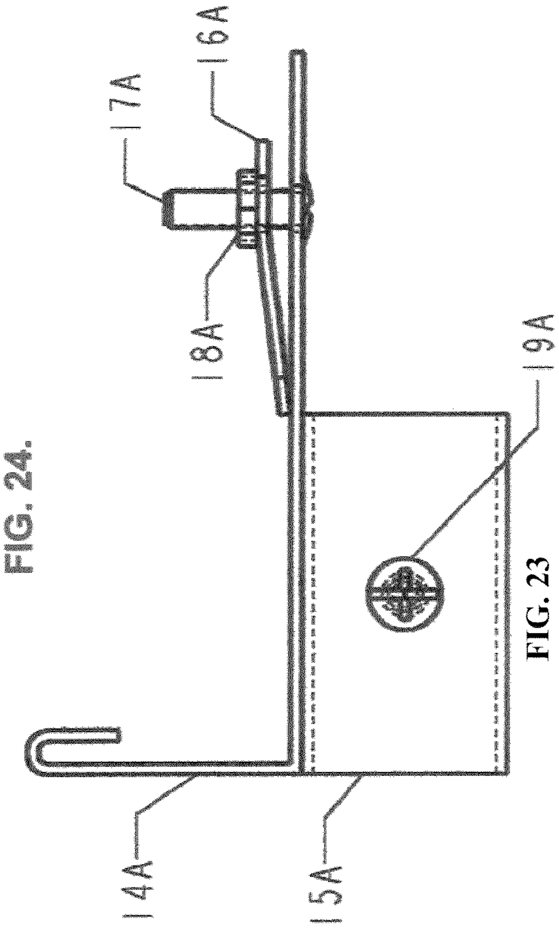
FIG. 23. is a side view of the mounting bracket of FIG. 21.
Figure 22:
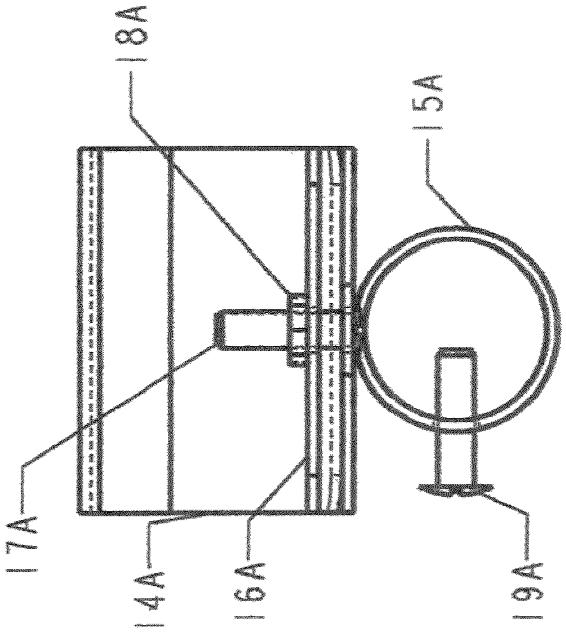
FIG. 22. is an end view of the mounting bracket of FIG. 21.

FIGS. 19-24 represent an optional mounting bracket. FIG. 19 is a perspective view of the attachment bar of FIG. 11, including optional mounting brackets, with the device of FIG. 16 illustrated attached. FIG. 20 is a side view of the attachment bar of FIG. 19 with the device of FIG. 16 illustrated attached. FIG. 21 is a perspective of the optional mounting brackets illustrated on the attachment bar in FIG. 19. FIG. 22 is an end view of the mounting bracket of FIG. 21. FIG. 23 is a side view of the mounting bracket of FIG. 21. FIG. 24 is a top view of the mounting bracket of FIG. 21.

The mounting bracket illustrated in FIGS. 21-24 is an L-shaped bracket with a 180 degree bend with a 3/16 inch gap along one end. This allows it to fit over the top edge of the side rail of a bed frame. At the other end of the longer edge is a through hole. The bottom edge of the bed frame is sandwiched between the lower edge of 14A and the lock down plate 16A and locked in place with fastener 17A and a nut or wing nut 18A. A tube 15A is welded to the longer outside part of the L-shaped bracket. The tube 15A includes a hole drilled in one side and a wing/thumb screw 19A is screwed into the hole after the tube 15A is placed at the proper level on the attachment bar 12. An identical mounting bracket 14B is made, assembled, and used as described above.

Figure 25:
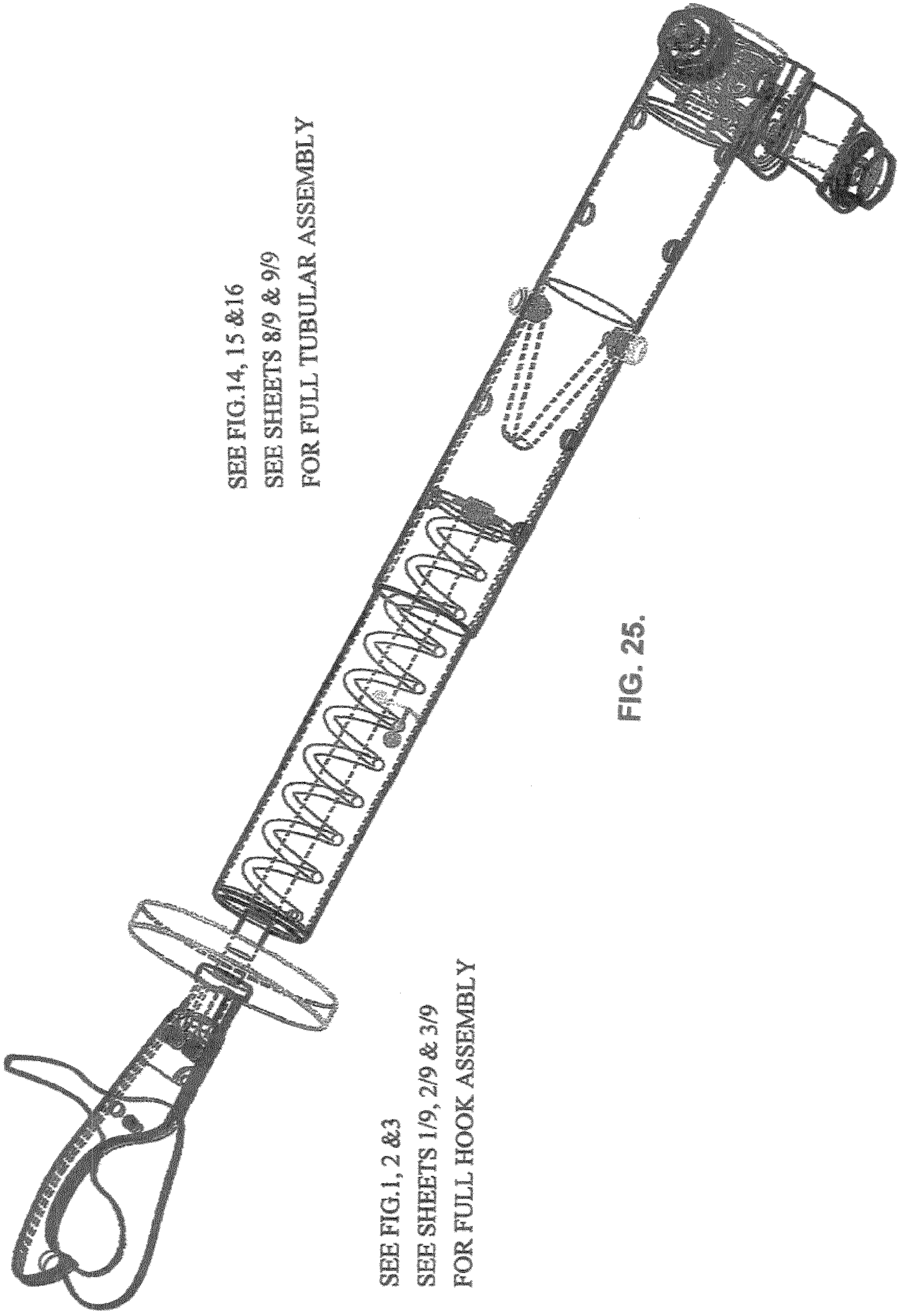
FIG. 25. is a perspective view of a fourth embodiment of the wheelchair stabilizing device.

FIG. 25 is a perspective view of a fourth embodiment of the wheelchair stabilizing device. This embodiment combines the latch and swing arm illustrated in and described above with respect to FIGS. 16-18, with the variable length extendable shaft swing arm illustrated in and described above with respect to FIGS. 1-7.

Figure 26:
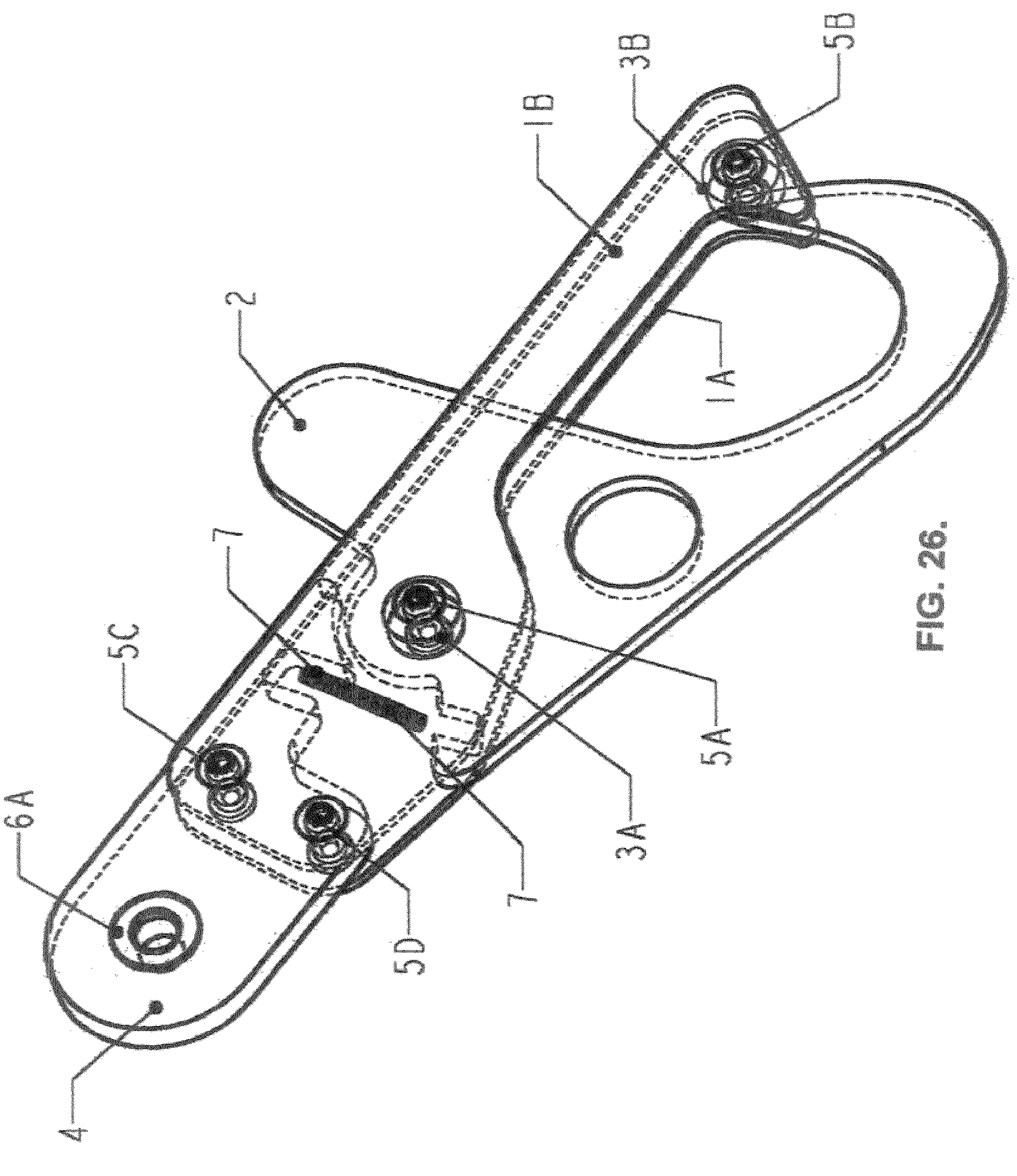
FIG. 26. is a perspective view of a fourth embodiment of the wheelchair stabilizing device.
Figure 27:
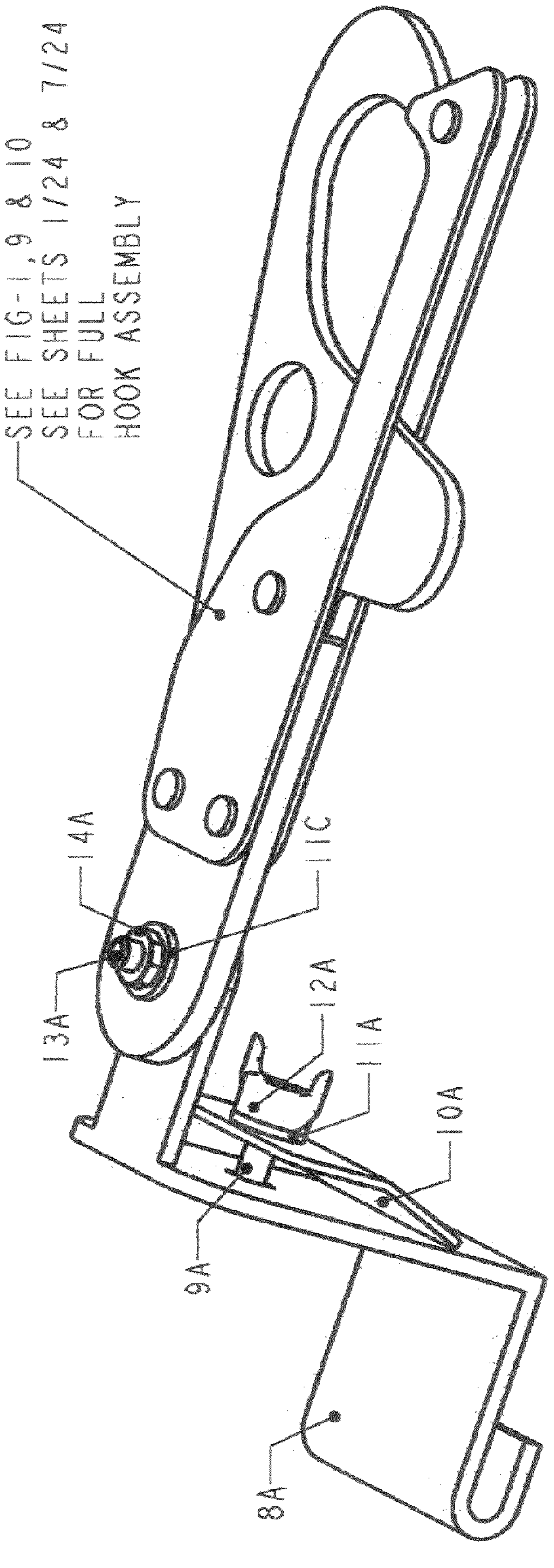
FIG. 27. is another perspective view of the device of FIG. 26 with a first optional mounting bracket.
Figure 28:
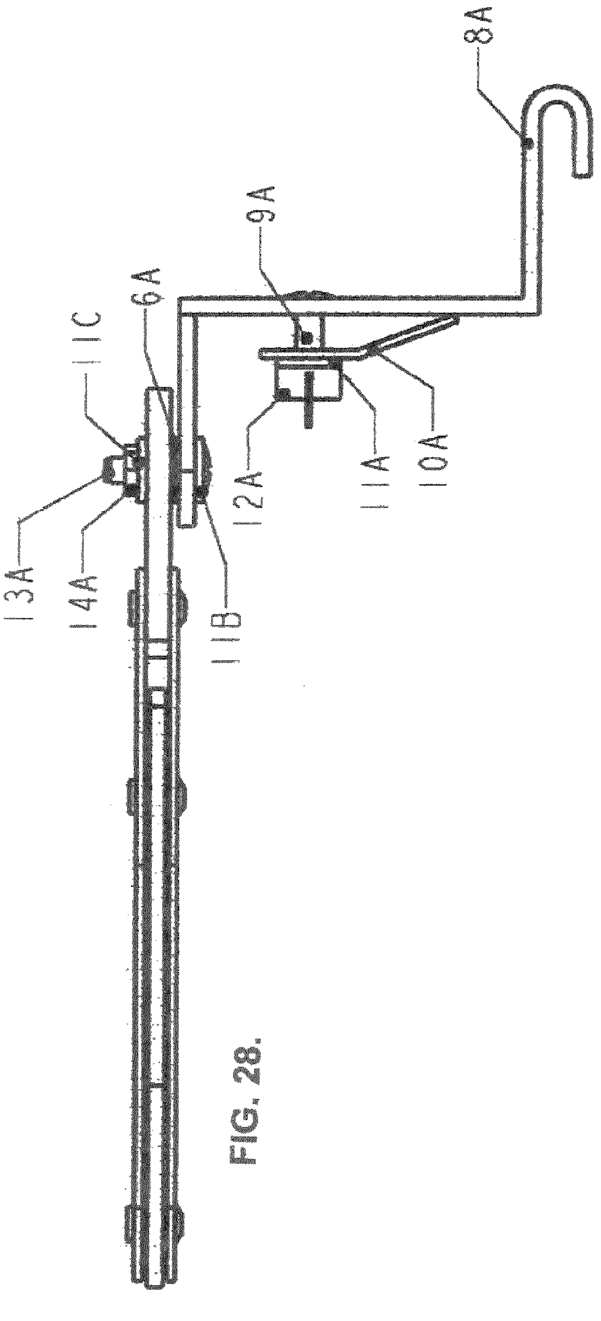
FIG. 28. is a top view of the device of FIG. 27.
Figure 29:
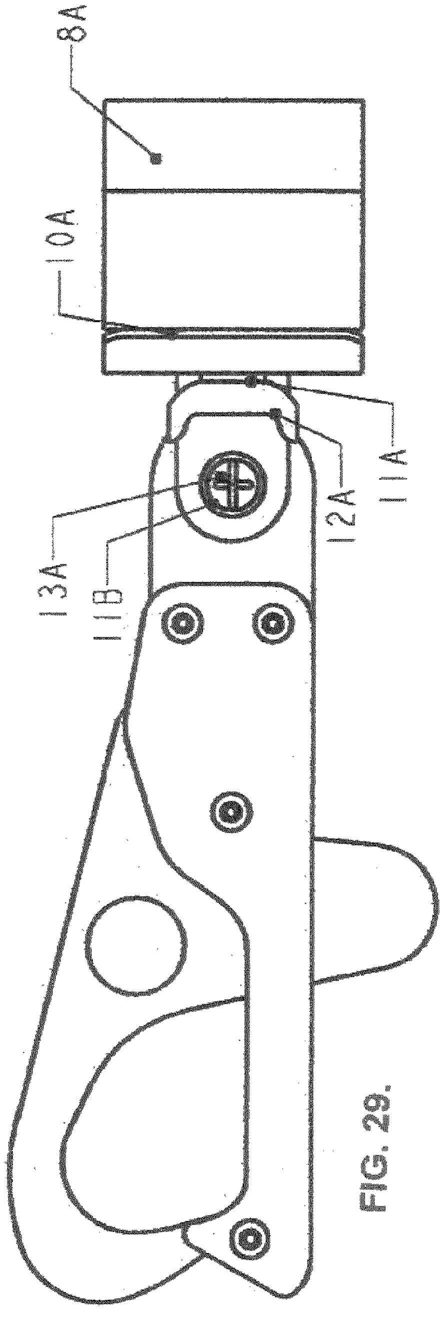
FIG. 29. is a side view of the device of FIG. 27.

FIGS. 26-29 represent a fourth embodiment of the wheelchair stabilizing device. FIG. 26 is a perspective view of a fourth embodiment of the wheelchair stabilizing device. FIG. 27 is another perspective view of the device of FIG. 26 with a first optional mounting bracket. FIG. 28 is a top view of the device of FIG. 27. FIG. 29 is a side view of the device of FIG. 27.

The wheelchair stabilizing device of FIGS. 26-29 is assembled in a manner similar to that of the embodiment discussed above with respect to FIGS. 16-18, including use of the compression spring. The mounting bracket of FIGS. 26-29 differs, however, from the mounting bracket of FIGS. 16-18. In FIGS. 26-29, a washer is placed over fastener 13A which is then placed through the single through hole in the Conventional Angle Iron Bed Frame Bracket 8A. A Spring/Wave Washer 6A is placed down over the fastener 13A, and sandwiched between the Conventional Angle Iron Bed Frame Bracket 8A and the Swing/Pivot Arm 4. The assembly is locked into place with washer 11C and a Self Locking Device 14A. The Conventional Bed Frame Bracket 8A is an L Shaped Bracket with a 180 degree bend with a 3/16th inch gap along one end, allowing it to fit over the inside bottom edge of the angle iron frame in such a way that the box springs sit on top of the bracket and helps hold the bracket in place. Carriage Bolt 9A is placed through the Conventional Angle Iron Bed Frame Bracket 8A and the Lockdown Plate 10A is placed over the Carriage Bolt 9A with the outside of the Angle Iron Bed Frame sandwiched between the Conventional Angle Iron Bed Frame Bracket 8A and the Lockdown Plate 10A. The Lockdown Plate 10A is fastened in place by washer 11A and Wing Nut 12A.

The Swing Arm 4 and the Spring/Wave Washer 6A allow the user to swing the Wheelchair Stabilizing Device in close to the frame of the bed and out of the way when not in use. When ready to use, the user swings the Wheelchair Stabilizing Device out, and the Spring/Wave Washer 6A holds the Wheelchair Stabilizing Devise in place as the user rolls up to the latch arm 2 in FIG. 26. The pressure against the latch arm 2 opens the latch and the Compression Spring 7 securely closes the latch arm 2 around the frame of the manual wheelchair and holds the wheelchair securely in place during the transfer to and from the bed. When transfer is completed, the user can use the Thumb Release or the Finger hole on the latch arm 2 to open the latch, unhooking the Wheelchair Stabilizing Device from the wheelchair frame. The Wheelchair Stabilizing Device can be easily installed or removed as needed by the user or assistant.

FIGS. 28-29 show the Wheelchair Stabilizing Device, as illustrated and described above with respect to FIGS. 26-27, attached to the Conventional Angle Iron Bed Frame Bracket 8A with a fastener 13A and washer 11B placed through the single through hole in the Conventional Angle Iron Bed Frame Bracket 8A; a Spring/Wave Washer 6A is placed down over the fastener 13A, and fastener 13A is placed through the single through hole on the rounded end of swing arm 4. The fully assembled Wheelchair Stabilizing Device and the Conventional Angle Iron Bed Frame Bracket 8A is locked together with washer 11C and a Self Locking Device 14A. The mounting bracket 8A can be attached on either side of swing arm 4 as needed to accommodate different styles of wheelchairs and heights of conventional Angle Iron bed Frames. The Conventional Angle Iron Bed Frame Bracket 8A is an L Shaped Brackett with a 180 degree bend with a 3/16th inch gap along one end, allowing it to fit over the inside bottom edge of the angle iron bed frame in such a way that the box springs sit on top of the bracket and helps hold the bracket in place. Carriage Bolt 9A is placed through the Conventional Angle Iron Bed Frame Bracket 8A and the Lockdown Plate 10A is placed over the Carriage Bolt 9A with the outside angle of the Conventional Angle Iron Bed Frame sandwiched between the Conventional Angle Iron Bed Frame Bracket 8A and the Lockdown Plate 10A. The Lockdown Plate 10A is locked into place with washer 11A and Wing Nut 12A.

FIGS. 27-29 assembly of the Wheelchair Stabilizing Device and mounting bracket 8A is for the single user, Physically Challenged Individuals, who transfer into their manual wheelchair each morning and do not transfer again until time to go to bed. Therefore, they only need the Wheelchair Stabilizing Device described here mounted to their Conventional Angle Iron Bed Frame.

Figure 30:
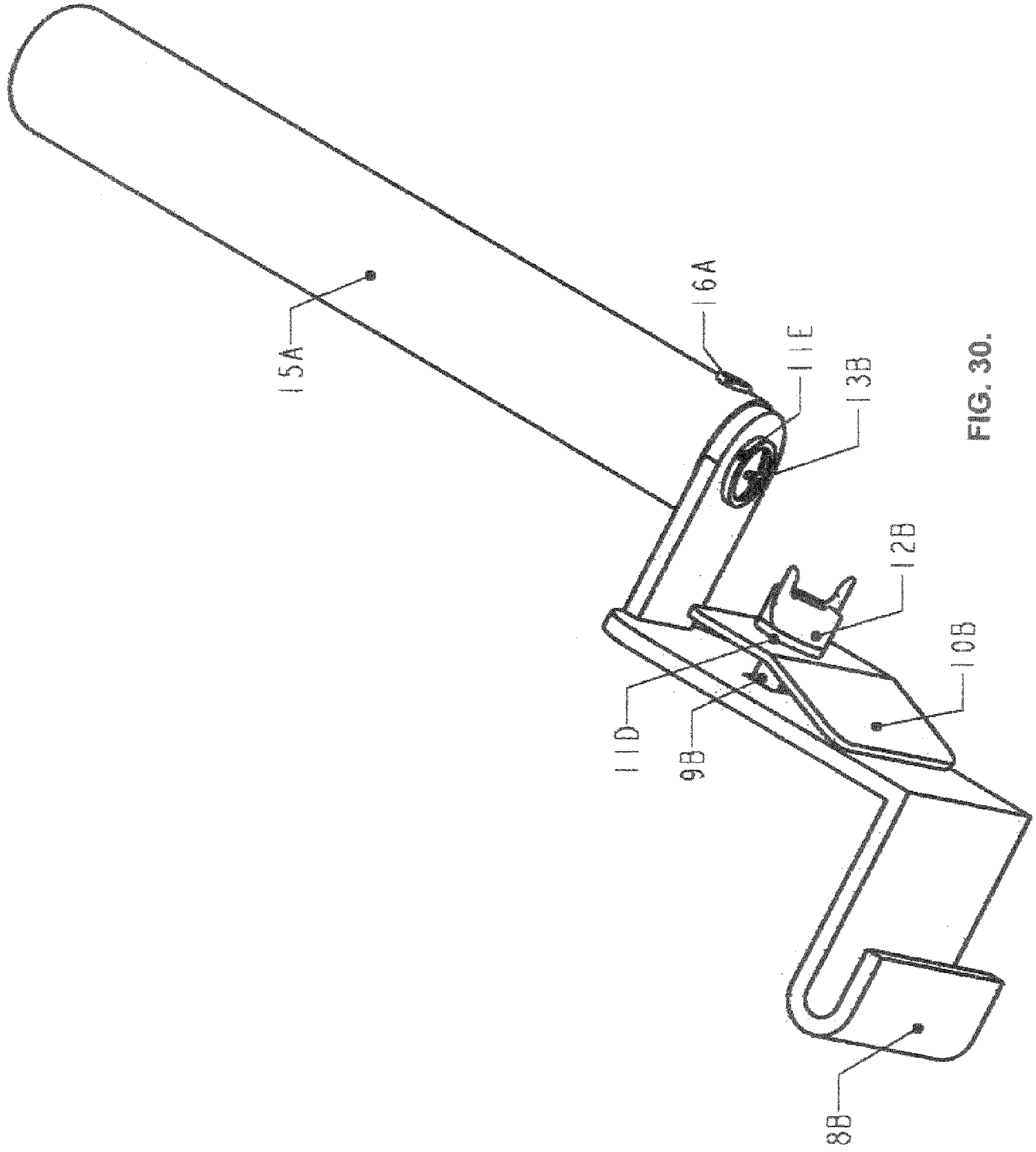
FIG. 30. is a perspective view of a receiving anchor post attached to the mounting bracket of FIG. 27.

FIG. 30 is a Conventional Angle Iron Bed Frame Bracket 8B, similar to the one illustrated and described above with respect to FIGS. 27-29. A solid Aluminum, Stainless Steel, or Industrial Strength Non-Chemical-Absorbent Plastic Anchor Post 15A is threaded on one end and screwed onto the fastener 13 B and Washer 11E. A Set Screw 16A is placed in a predrilled hole near the bottom of the solid Anchor Post 15A. The Set Screw 16A locks the Anchor Post in place and prevents the Anchor Post 15A from coming unscrewed from the Fastening Device 13B.

This type of Bracket assembly is for multiple users, Physically Challenged Individuals who transfer several times during the day (from a bed, shower chair, toilet, or vehicle) and have a Wheelchair Stabilizing Device permanently mounted on their wheelchair.

Figure 32:
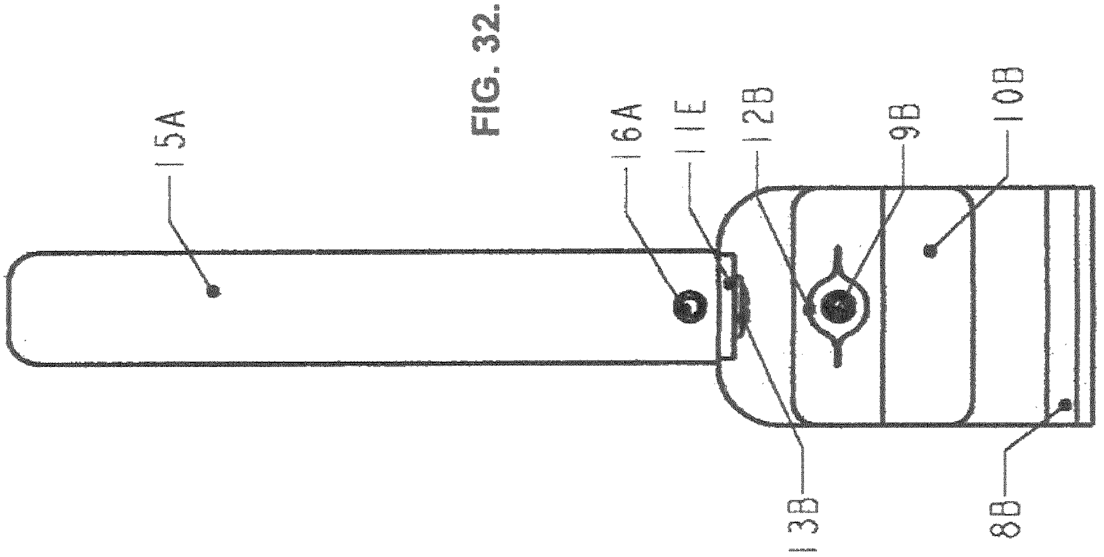
FIG. 32. is an end view of the device of FIG. 30.
Figure 31:
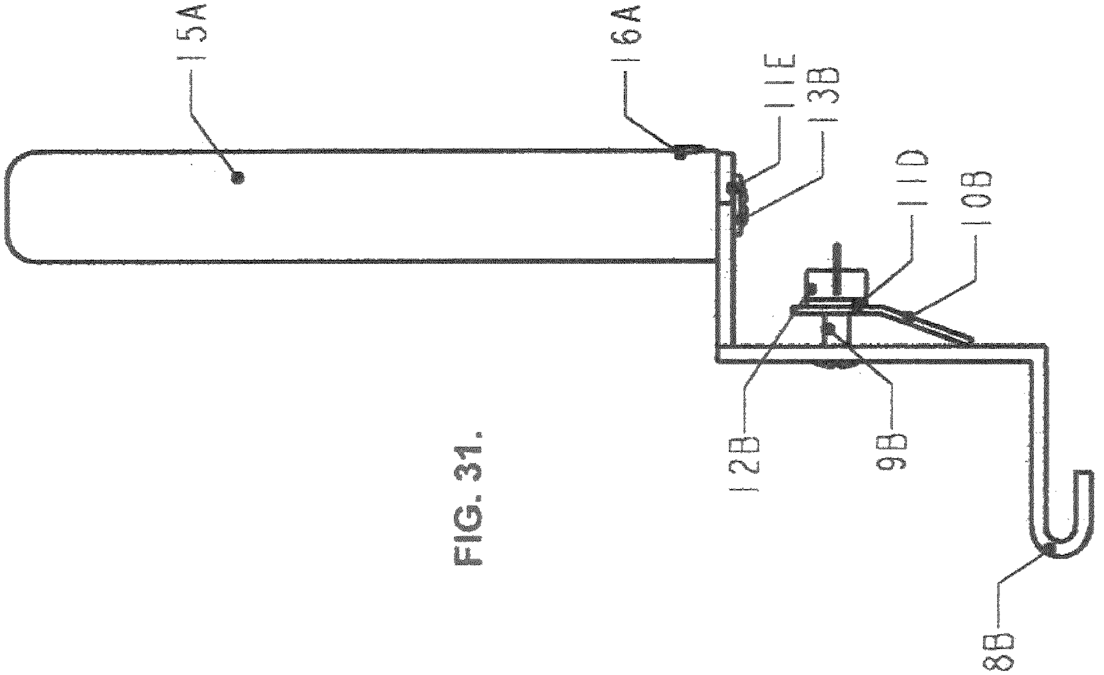
FIG. 31. is a side view of the device of FIG. 30.

FIGS. 31 and 32 show the Conventional Angle Iron Bed Frame Bracket 8B and the Anchor Post 15A. The fastener 13B and washer 11E can be place through either side of the Conventional Angle Iron Bed Frame Bracket 8B such that the Anchor Post 15A can be mounted in an up right position (as illustrated) or a downward position (not illustrated) as needed for different styles of wheelchair frames. Both FIGS. 31 and 32 show the position of the Lockdown Plate 10B held in place as described above with a fastener 13B, Washer 11E and the placement of the Set Screw 16A.

Figure 33:
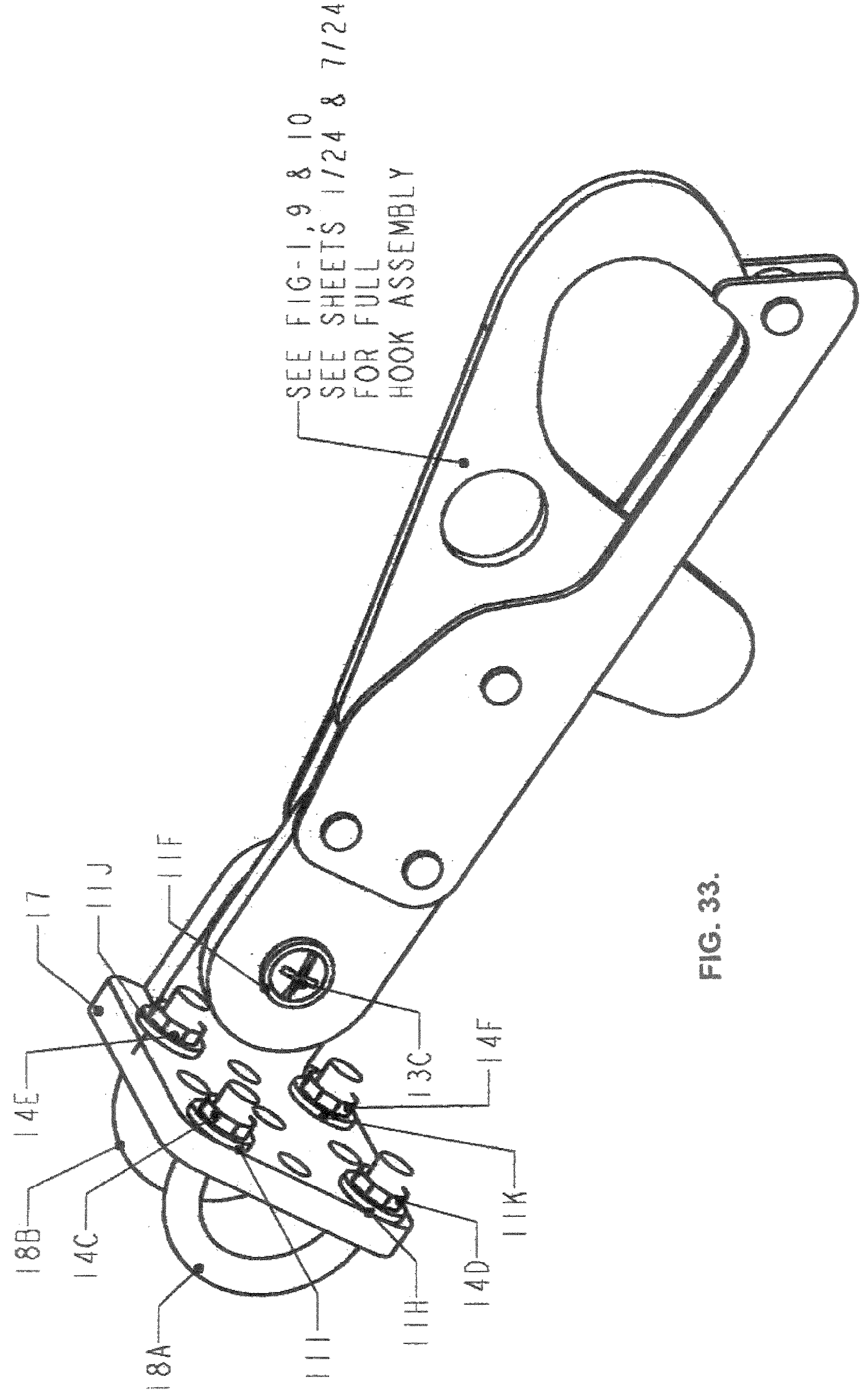
FIG. 33. is a perspective view of the device of FIG. 26 with a second optional mounting bracket.
Figures 34, 35:
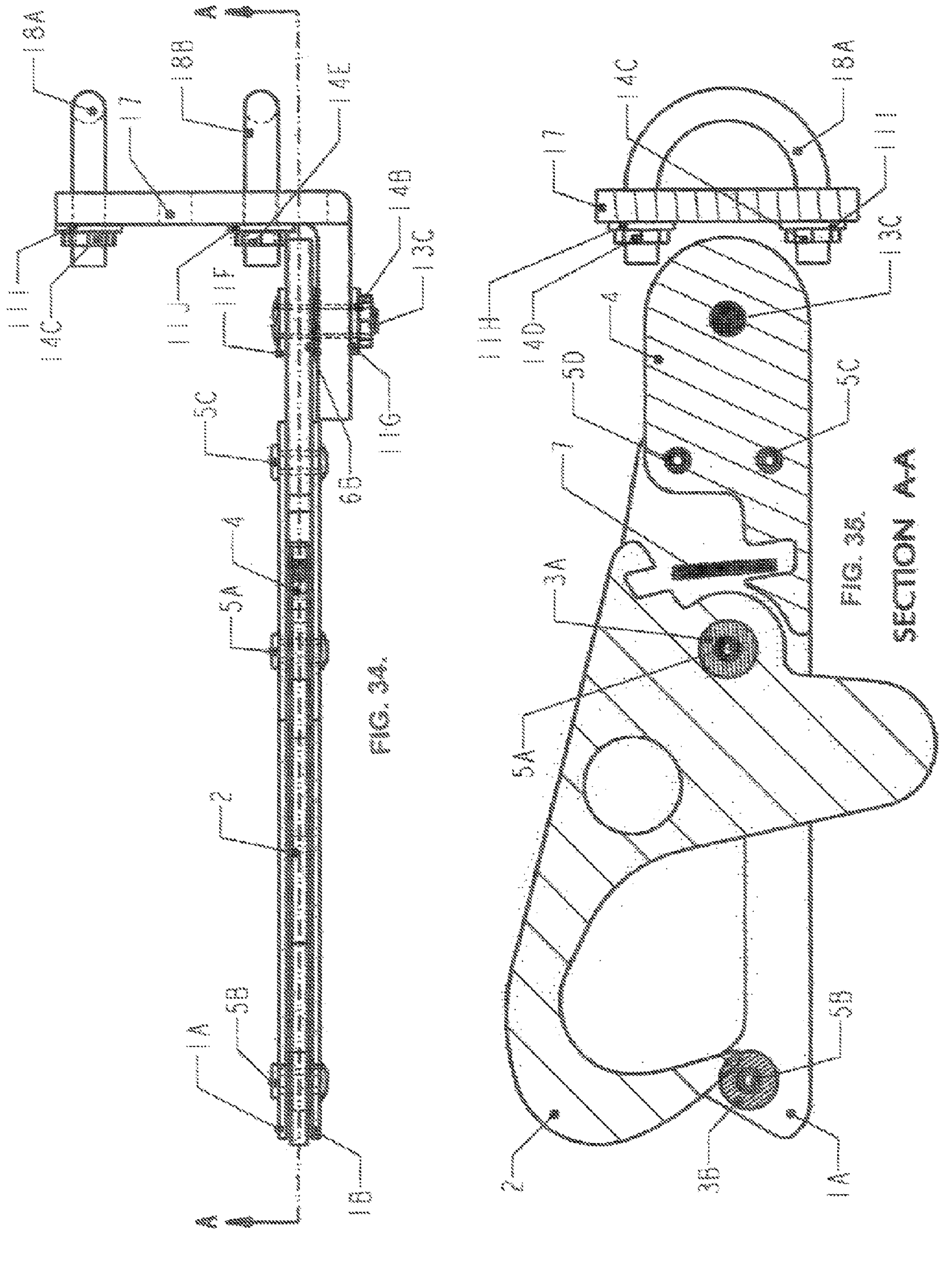
FIG. 34. is a top view of the device of FIG. 33.
FIG. 35. is a cross-section of the device of FIG. 33 along the A-plane illustrated in FIG. 34.

FIGS. 33-35 show the Wheelchair Stabilizing Device mounted to a Universal Mounting Bracket 17 for use on a manual style wheelchair. The Universal Mounting Bracket 17 has 9 predrilled holes evenly spaced for positioning U-Bolts 18A and 18B in different hole positions to accommodate different styles and sizes of manual wheelchair frames. The U-Bolts 18A and 18B are tightened around the wheelchair frame with Washers 11H, 11I, 11J, and 11K and fasteners 14C, 14D, 14E, and 14F. The Wheelchair Stabilizing Device can be mounted on either side of the L-Shaped tab of the Universal Mounting Bracket 17 with fastener 13C and Washer 11F.

Figure 36:
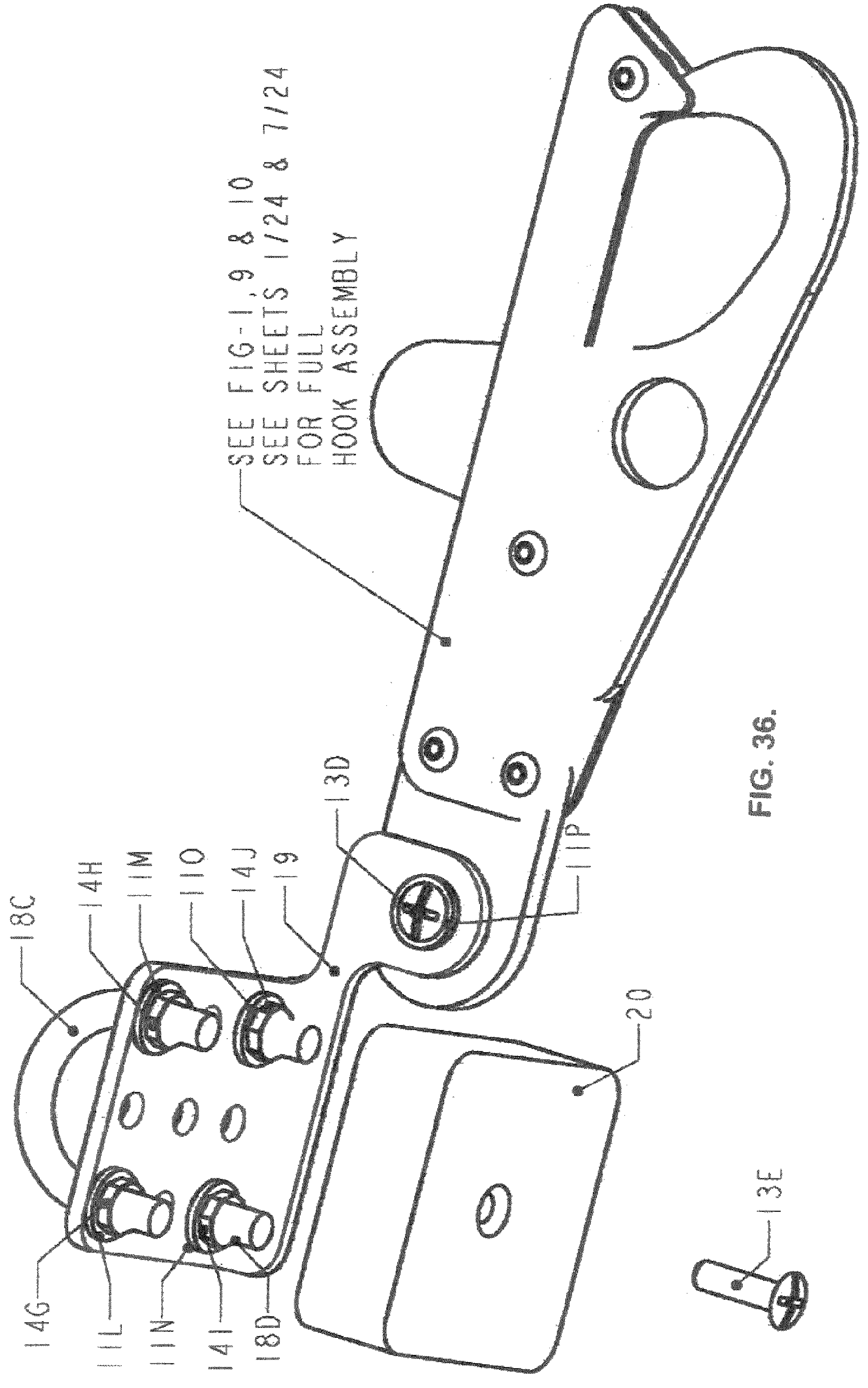
FIG. 36. is a perspective view of the device of FIG. 26 with a third optional mounting bracket.
Figures 37, 38:
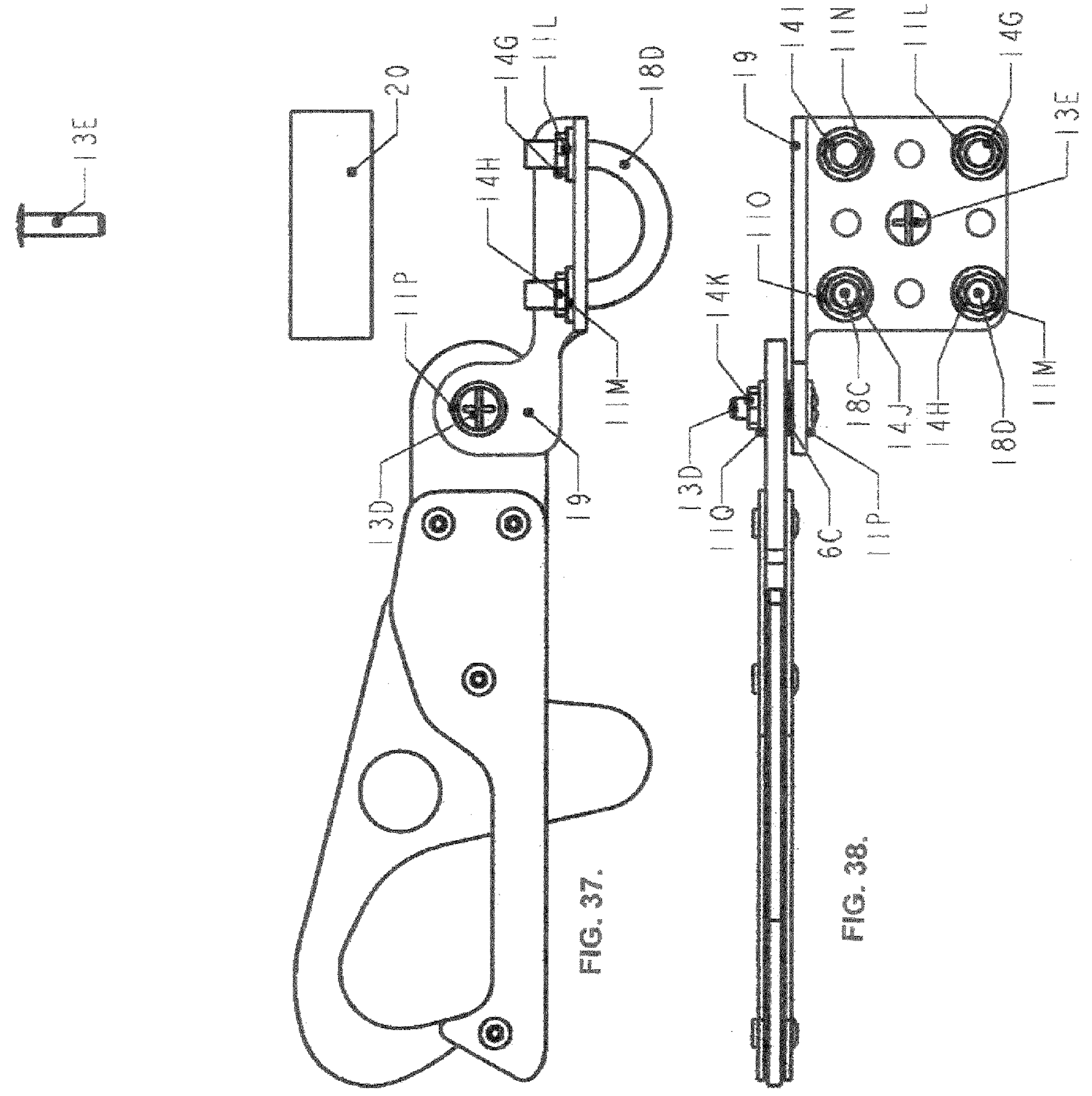
FIG. 37. is a side view of the device of FIG. 36.
FIG. 38. is a top view of the device of FIG. 36.

FIGS. 36-38 show the Wheelchair Stabilizing Device assembled to another style of manual wheelchair bracket called the Extended Universal Mounting Bracket 19. The Universal Mounting Bracket 19 has 9 predrilled holes evenly spaced for positioning U Bolts 18C and 18D in different hole positions to accommodate different styles and sizes of manual wheelchair frames. The U-Bolts 18C & 18D are tightened around the wheelchair frame with Washers 11L, 11M, 11N, & 11O and fasteners 14G, 14H, 141, & 14I. The Wheelchair Stabilizing Device can be mounted on either side of the Extended smaller L-Shaped tab of the Universal Mounting Bracket 19 with fastener 13D and Washer 11P. The Extended Universal Mounting Bracket 19 has a Plastic Cover 20 to protect the Manual Wheelchair User from possible injury due to the bolt ends being exposed. The Plastic Cover 20 can also be used on the Universal Mounting Bracket 17 as described above with respect to FIGS. 33-35. The Plastic Cover 20 is fastened in place with a Fastening Device 13E.

Figure 39:
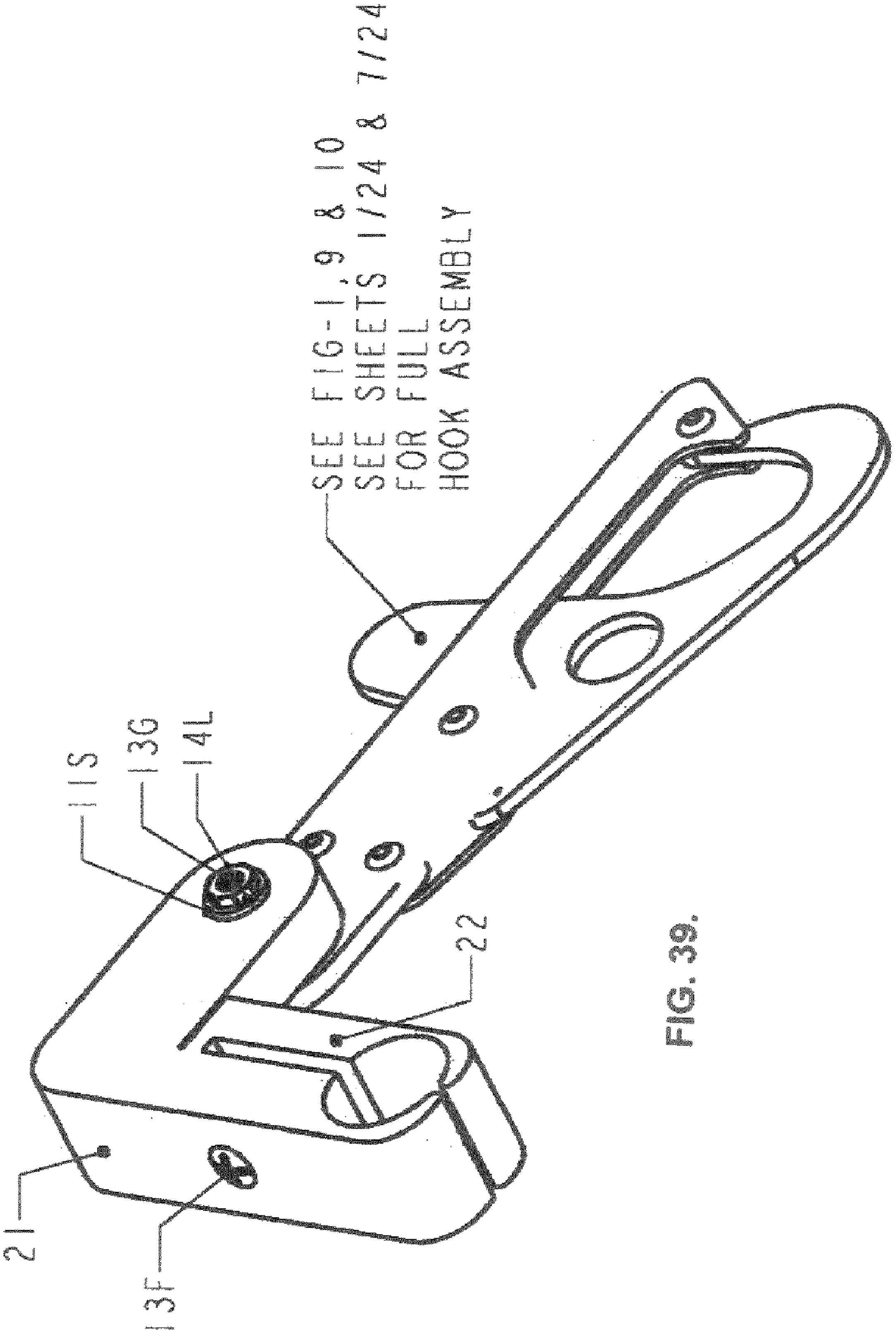
FIG. 39. is a perspective view of the device of FIG. 26 with a fourth optional mounting bracket.
Figure 40:
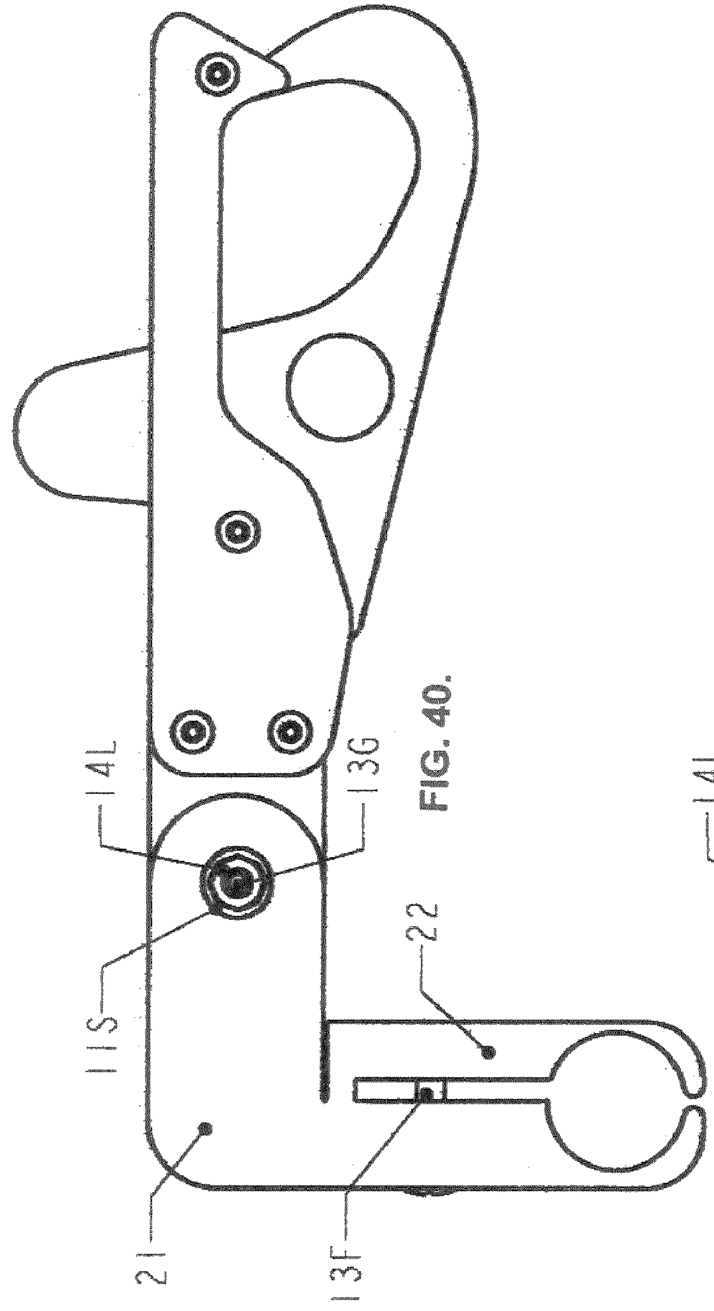
FIG. 40. is a side view of the device of FIG. 39.
Figure 41:
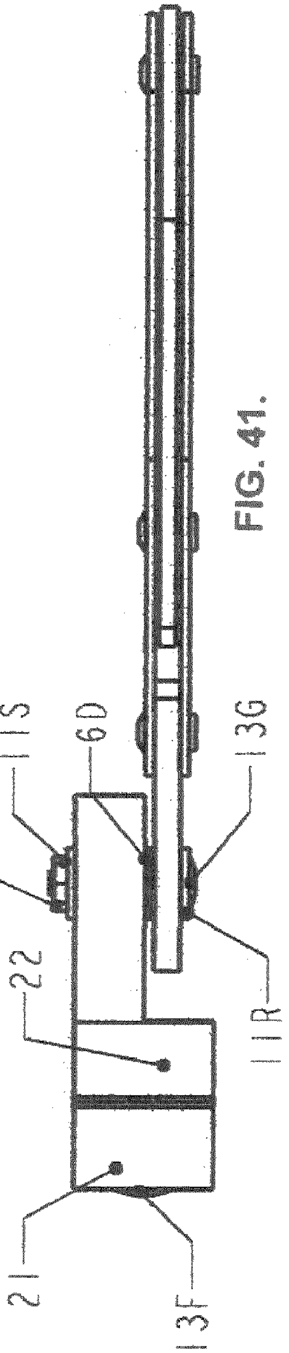
FIG. 41. is a top view of the device of FIG. 39.

FIGS. 39-41 illustrates the Wheelchair Stabilizing Device and another alternative mounting bracket for a manual wheelchair called the L-Shaped Mounting Bracket 21. The L-Shaped Mounting Bracket 21 is made up of two extruded pieces of solid Aluminum/Stainless Steel/Industrial Strength Non-Chemical-Absorbent Plastic. The Extruded L-Shaped Piece 21 is assembled to the Wheelchair Stabilizing Device with a fastener 13G, Washer 11S, and a Self Locking Device 14L. The L-Shaped Mounting Bracket 21 has a through hole drilled through the side of the bracket to receive a fastener 13F. The L-Shaped Mounting Bracket 21 also has an extruded half circle cut out that fits around the frame of a manual wheelchair and the Lockdown Extruded Piece 22 with a matching half circle cut out is placed around the other side of the wheelchair frame. The fastener 13F is fastened into the matching threaded hole in the Lockdown 22 to hold the Wheelchair Stabilizing Device securely onto the manual wheelchair frame.

Figure 42:
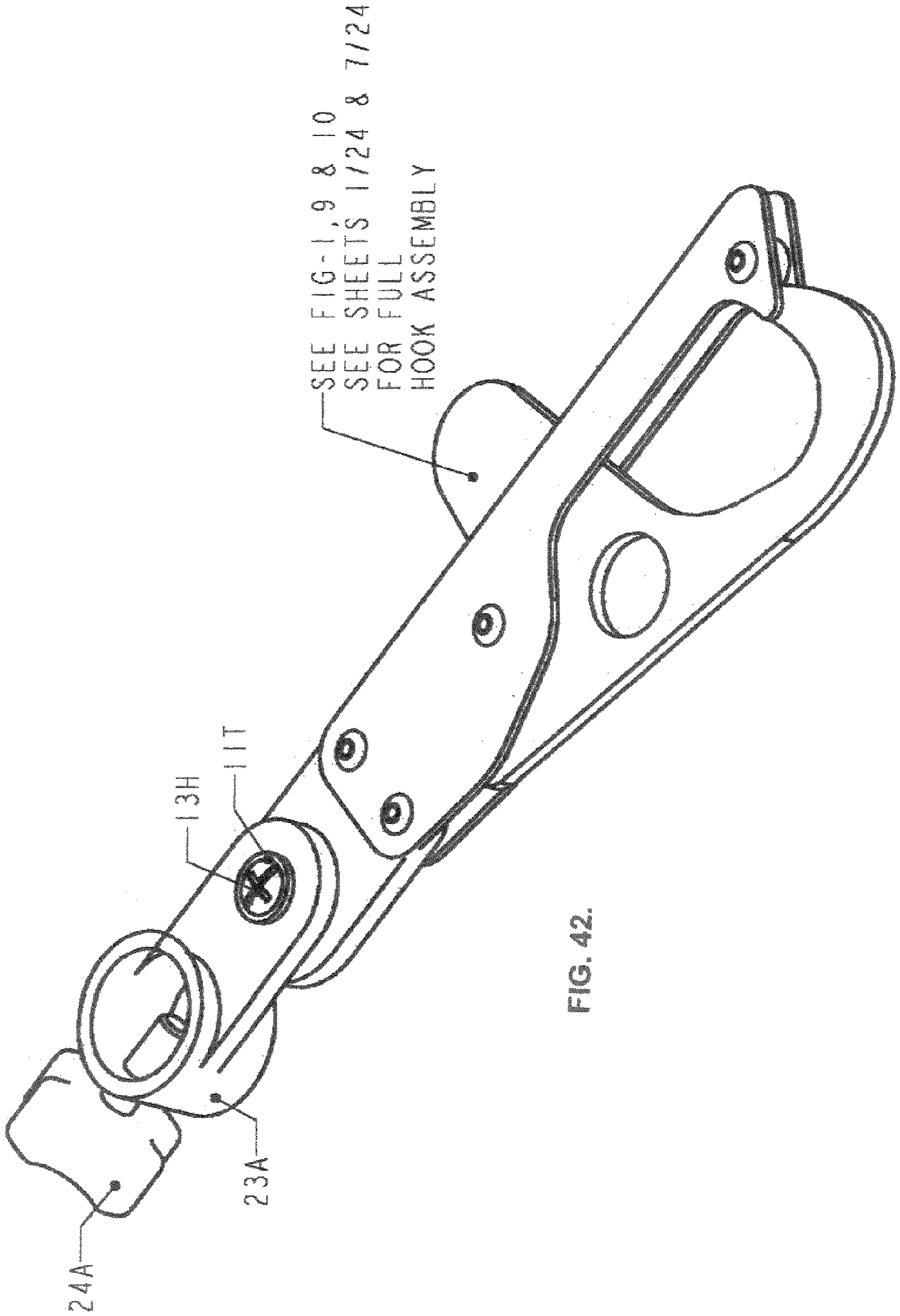
FIG. 42. is a perspective view of the device of FIG. 26 with a fifth optional mounting bracket.
Figure 43:
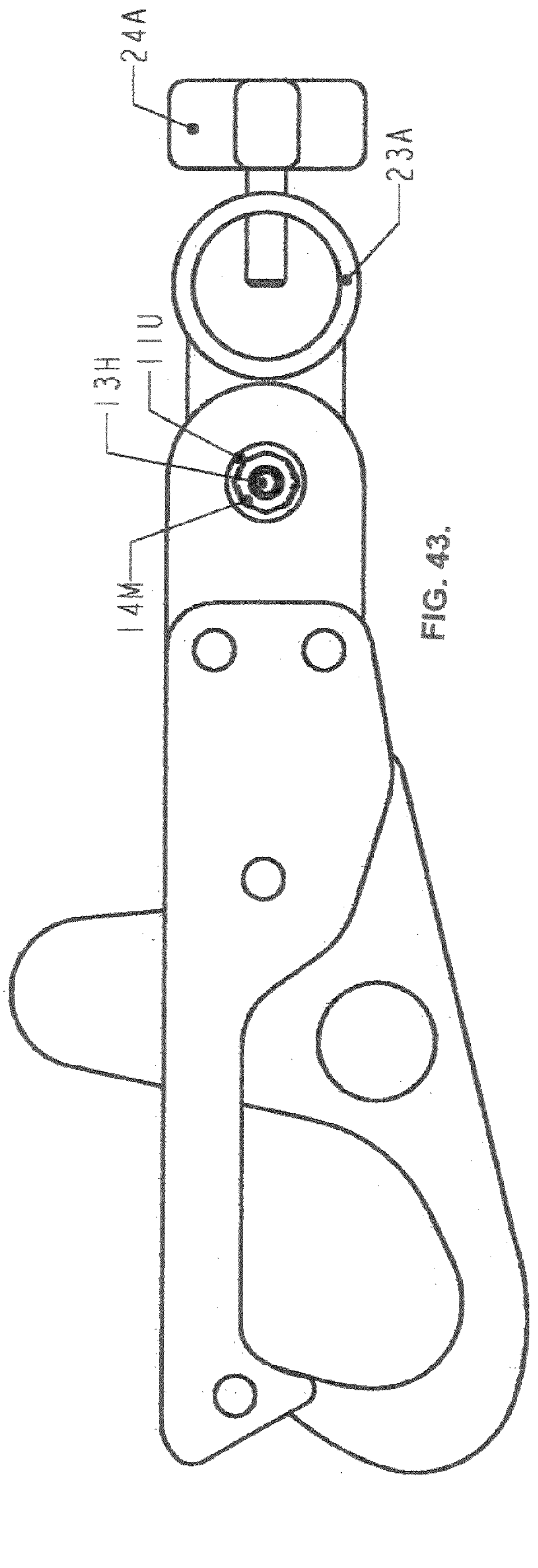
FIG. 43. is a side view of the device of FIG. 42.
Figure 44:
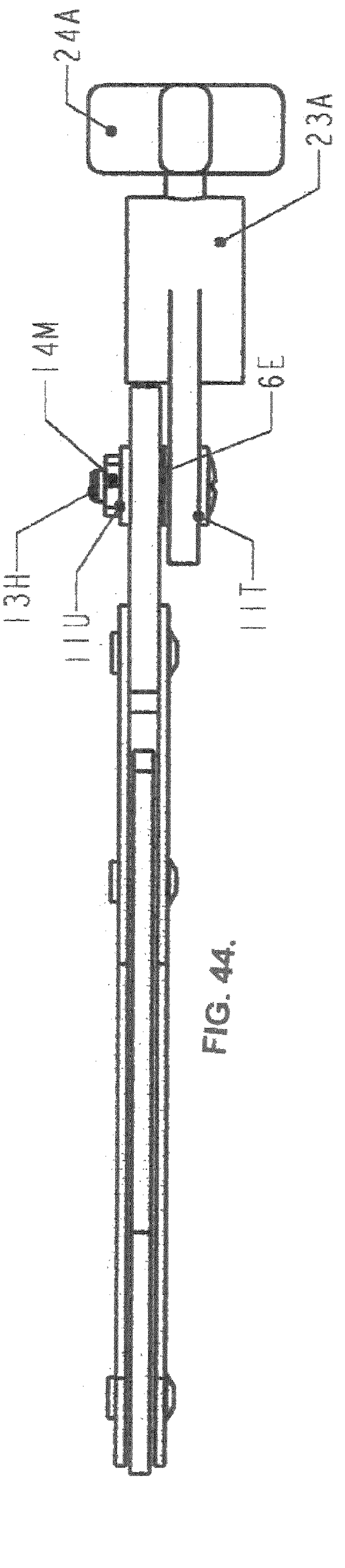
FIG. 44. is a top view of the device of FIG. 42.

FIGS. 42-44 show the Wheelchair Stabilizing Device and Adjustable Mounting Bracket 23A for use on a solid Anchor Post 15A assembly as described above. The Adjustable Mounting Bracket 23A is made of Aluminum/Stainless Steel/Industrial Strength Non-Chemical-Absorbent Plastic. The Adjustable Mounting Bracket 23A is a round Aluminum/Stainless Steel/Industrial Strength Non-Chemical-Absorbent Plastic tube large enough to slide up and down the solid Anchor Post 15A and has an extended piece welded/molded onto the side of the tube so the Adjustable Mounting Bracket 23A can be mounted on either side of the Swing/Pivot Arm 4 and is securely held in place with fastener 13H and Washer 11T. On the opposite side of the tube is a threaded through hole for the Thumb Screw 24A. The Thumb Screw 24A locks the Wheelchair Stabilizing Device Securely in place when adjusted to the proper height on the solid Anchor Post 15A.

Figure 45:
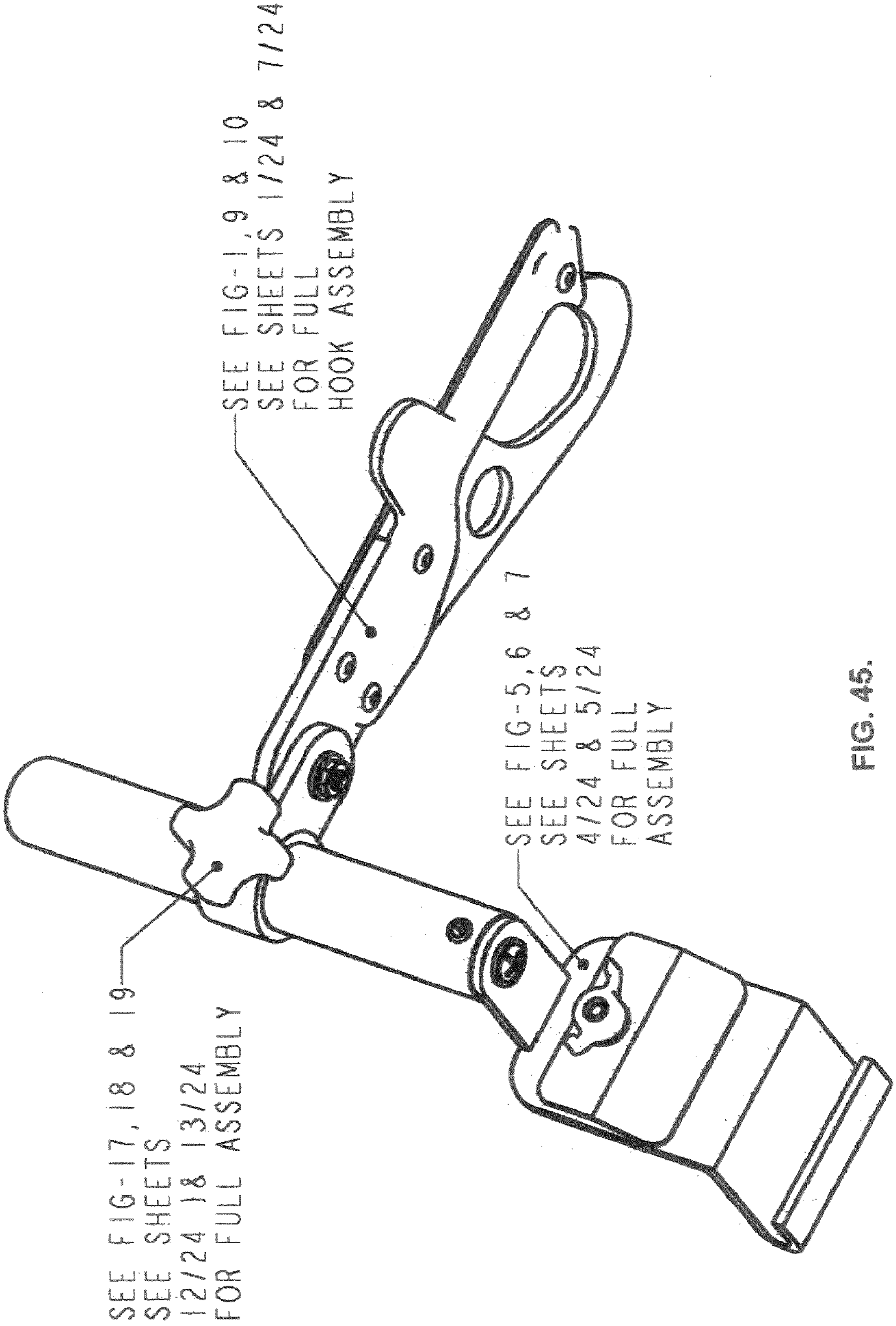
FIG. 45. is a perspective view of the device of FIG. 26 with a sixth optional mounting bracket and attached to the receiving anchor post of FIG. 30.

FIG. 45 illustrates the Wheelchair Stabilizing Device, the Adjustable Mounting Bracket 23A as illustrated and described above with respect to FIGS. 42-44, and the solid Anchor Post as illustrated and described above with respect to FIG. 30.

Figure 46:
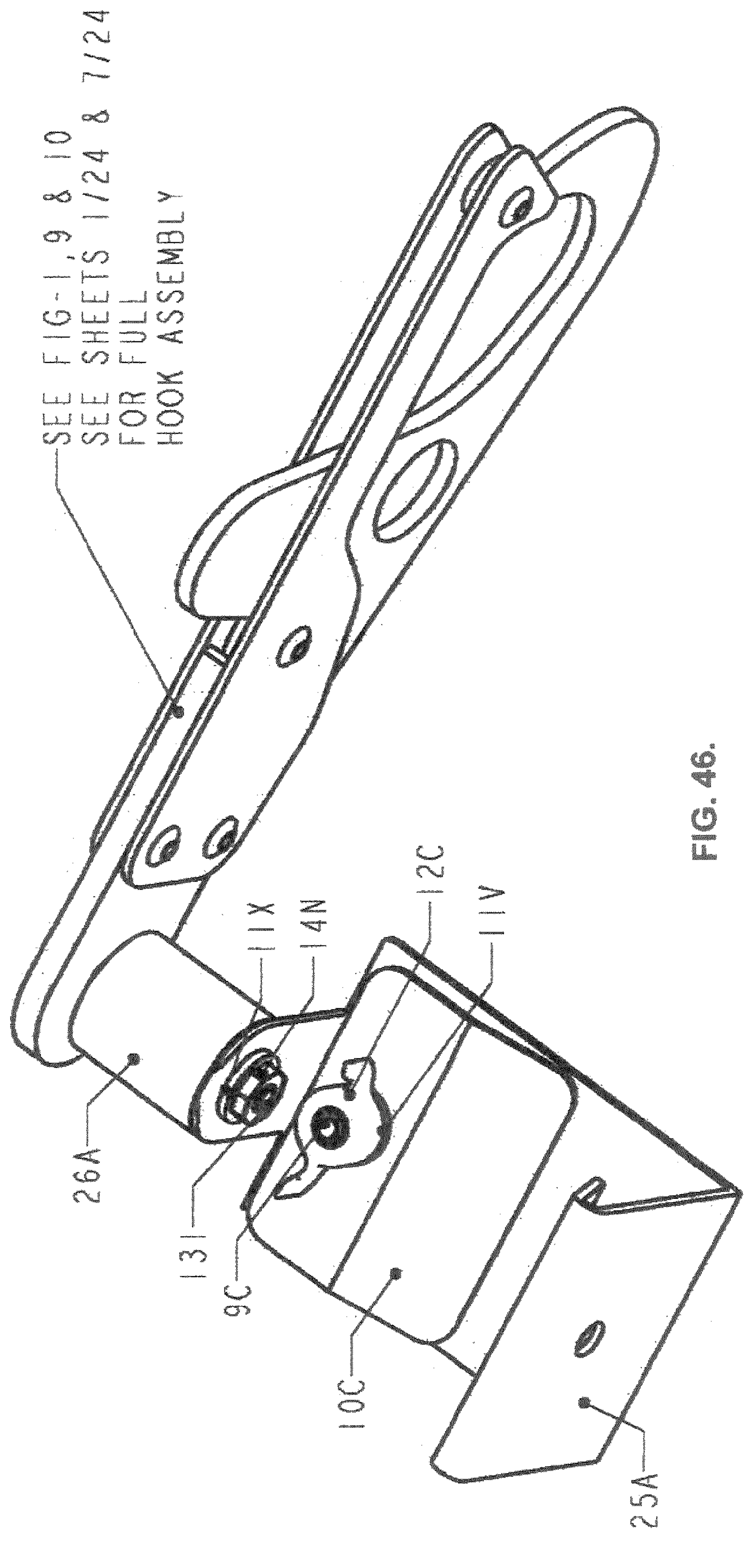
FIG. 46. is a perspective view of the device of FIG. 26 with a seventh optional mounting bracket.
Figure 48:
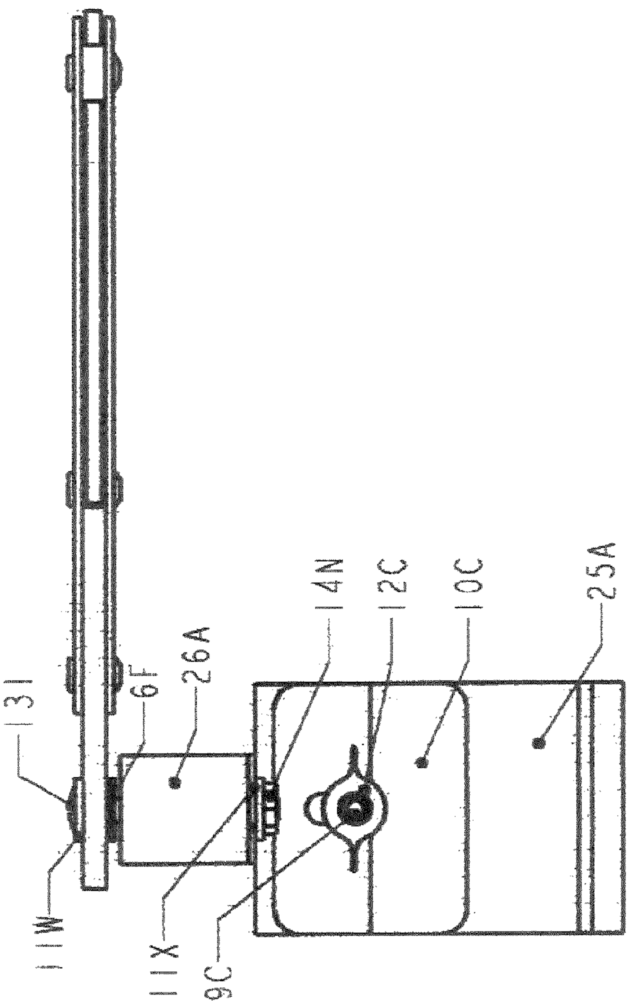
FIG. 48. is a top view of the device of FIG. 46.
Figure 47:
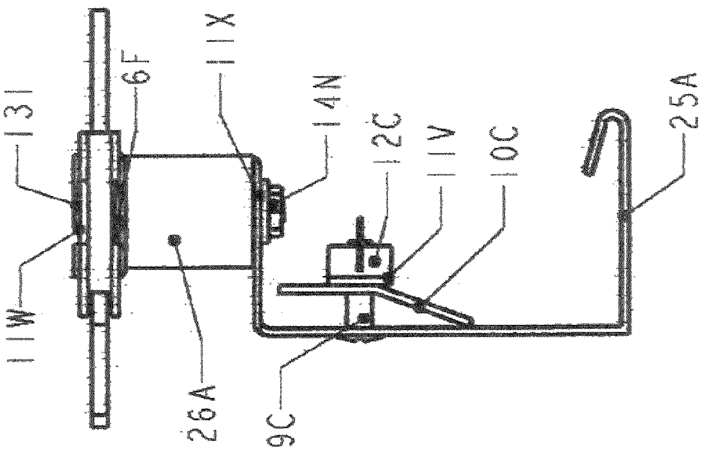
FIG. 47. is a side view of the device of FIG. 46.

FIGS. 46-48 show the Wheelchair Stabilizing Device and an Angle Framed Hospital Bed Mounting Bracket 25A. The Angle Framed Hospital Bed Mounting Bracket 25A can be assembled on either side of the Swing/Pivot Arm 4. This assembly has a spacer 26A with a hole drilled through the center. The spacer 26A can be cut at various lengths to accommodate many styles and heights of wheelchairs used by hospitals and private individuals who bring their wheelchairs to the hospital with them. The spacer 26A with a hole drilled through the center is held in place with a fastener 13I, Washer 11X, and Self Locking Device 14N. The Angle Framed Hospital Bed Mounting Bracket 25A is a U Shaped Bracket with a 180 degree bend with a 3/16th inch gap along one end, allowing it to fit over the top edge of the side rail of a hospital bed frame. Towards the bottom of the center section of the U shaped bracket is a through hole. Carriage Bolt 9C is placed through the through hole and the Lockdown Plate 10C is placed over the carriage Bolt. The bottom edge of the bed frame is sandwiched between the Angle Framed Hospital Bed Mounting Bracket 25A and the Lockdown Plate 10C. The Lockdown Plate 10C is locked in place with Washer 11V and Wing Nut 12C. This assembly when placed on a hospital bed allows the Wheelchair Stabilizing Device and its mounting bracket to be permanently attached to the hospital bed and the Wheelchair Stabilizing Device can be positioned just under the side rail where the user can easily swing the Wheelchair Stabilizing Device out into position and attach it to the wheelchair for safer transfers in and out of bed. By being permanently attached to the hospital bed, it is always available for all wheelchair users in the hospital.

Figure 49:
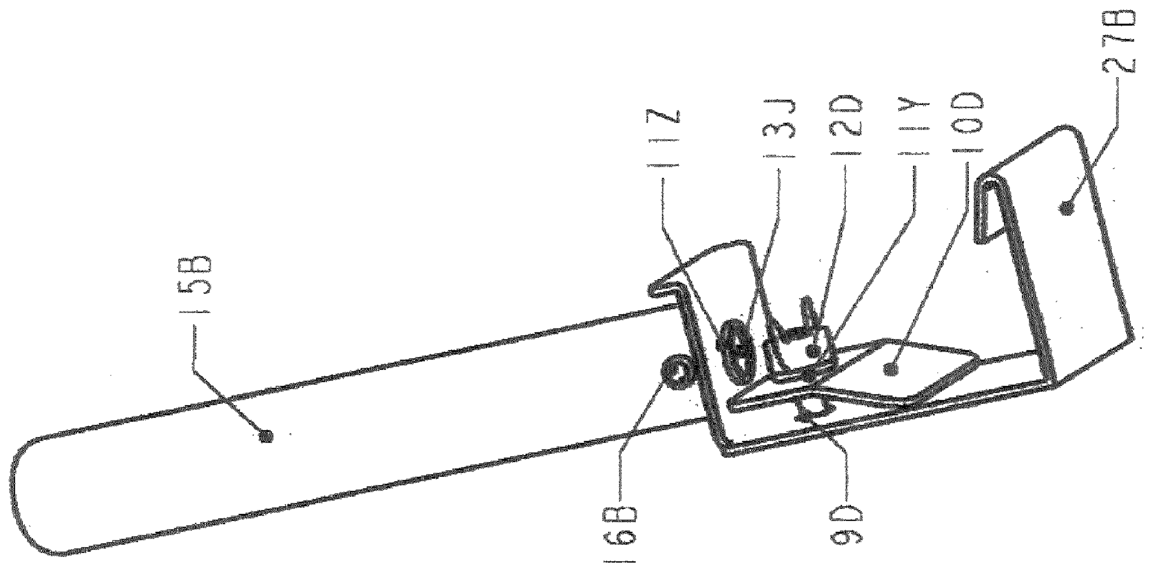
FIG. 49. is a perspective view of the receiving anchor post of FIG. 30 attached to the seventh optional mounting bracket illustrated in FIG. 46.
Figure 51:
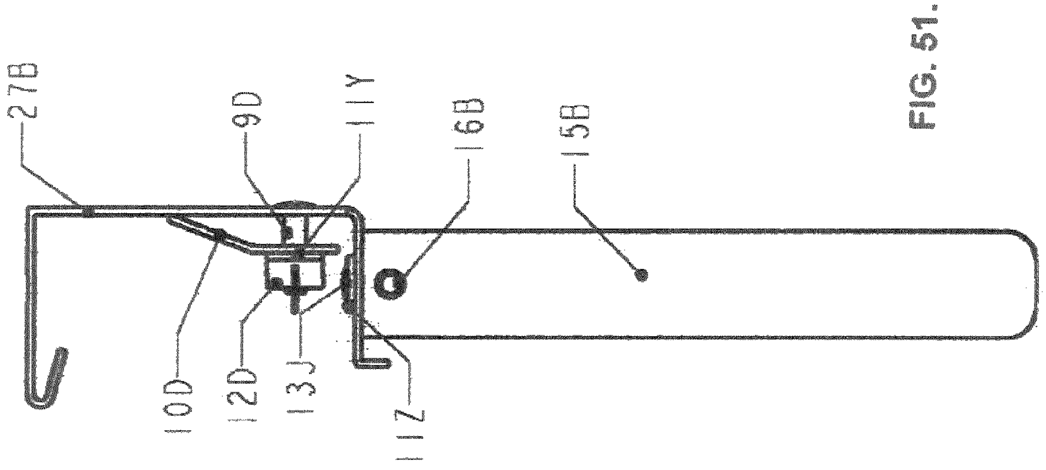
FIG. 51. is a side view of the device of FIG. 49.
Figure 50:
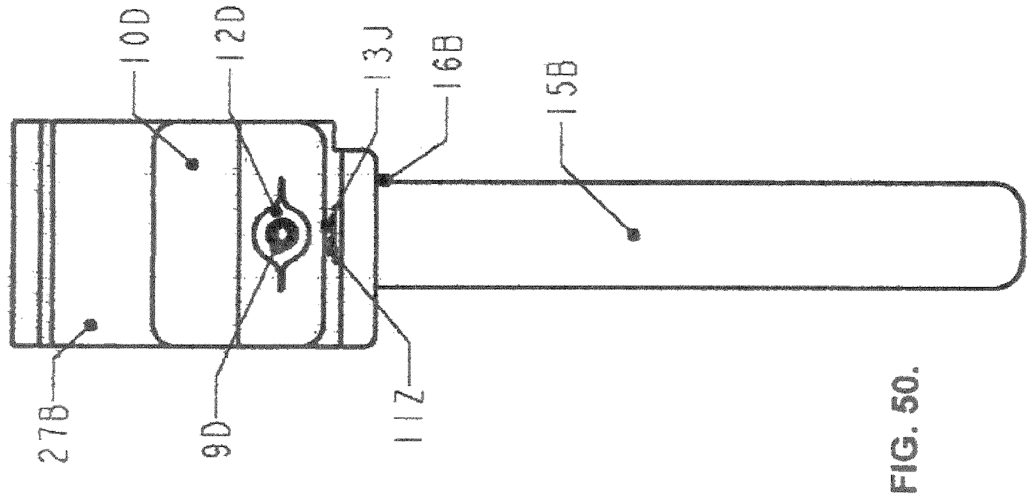
FIG. 50. is an end view of the device of FIG. 49.

FIGS. 49-51 show an alternative Angle Framed Hospital Bed Mounting Bracket 27B connected to Anchor Post 15B. The assembly can be permanently mounted to the hospital bed frame for Wheelchair Users who have the Wheelchair Stabilizing Device permanently attached to their manual wheelchairs. The user would roll the manual wheelchair up to the bed and position the Wheelchair Stabilizing Device in such a way as to hook/latch the Wheelchair Stabilizing Device around the Anchor Post 15B thereby holding the manual wheelchair in place while transferring in and out of bed. The hospital beds that would use this type of Angle Framed Hospital Bed Bracket 27B would probably be hospital beds used in private homes.

Figure 52:
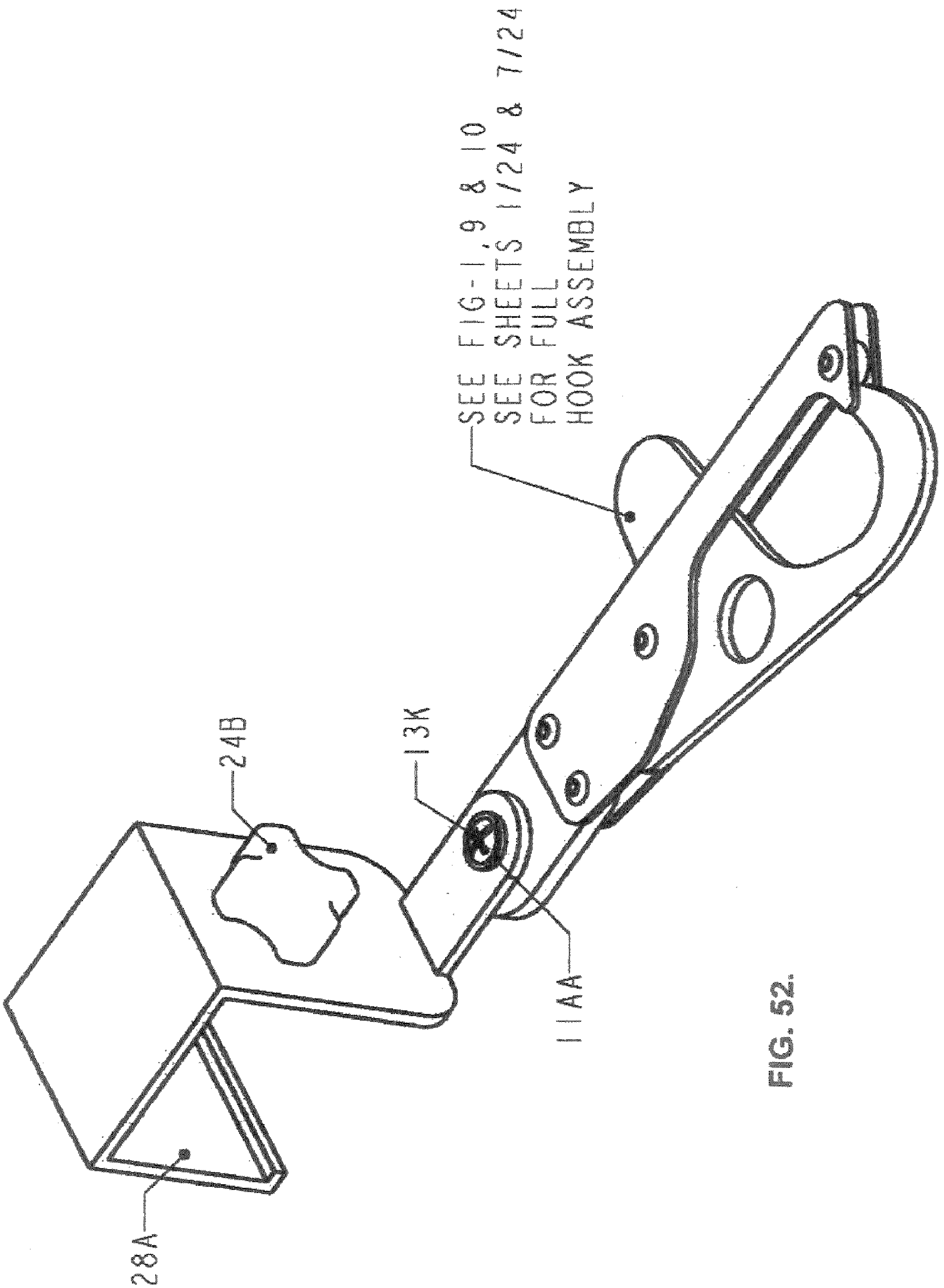
FIG. 52. is a perspective view of the device of FIG. 26 with an eighth optional mounting bracket.
Figure 54:
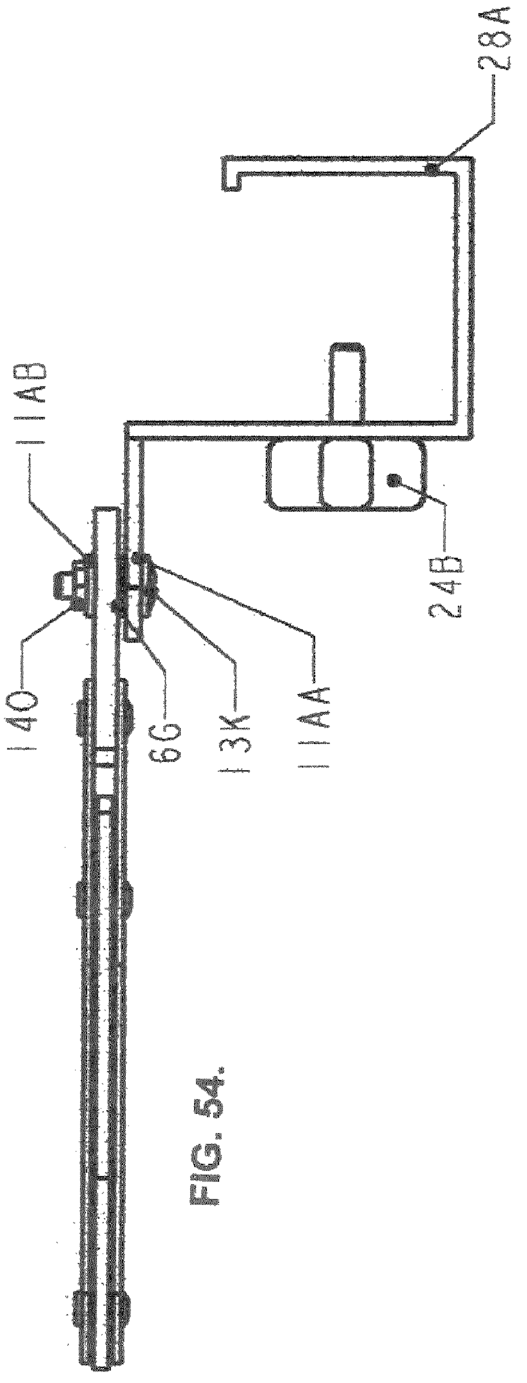
FIG. 54. is a top view of the device of FIG. 52.
Figure 53:
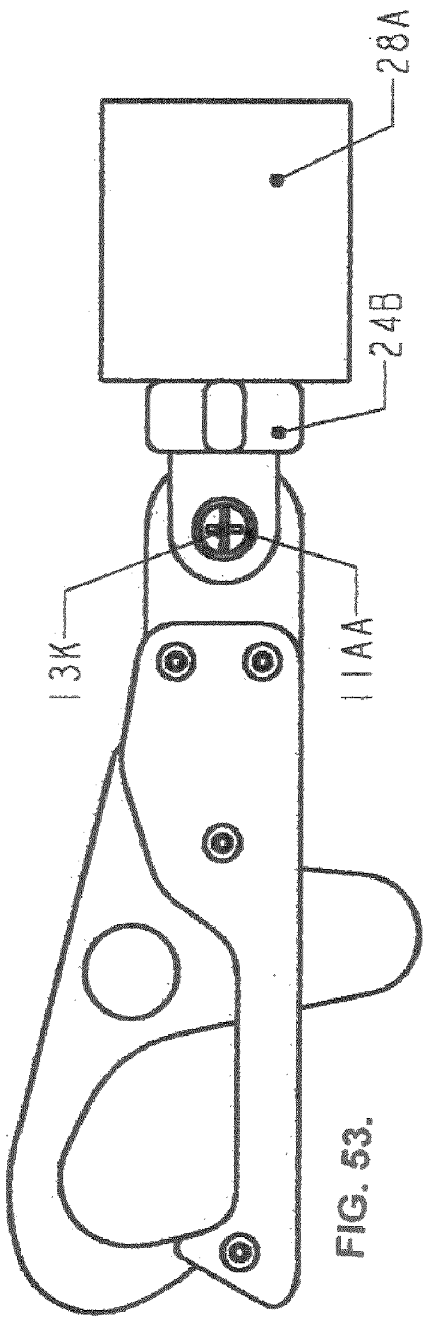
FIG. 53. is a side view of the device of FIG. 52.

FIGS. 52-54 show the Wheelchair Stabilizing Device and the Adjustable Toilet Mounting Bracket 28A. The Adjustable Toilet Mounting Bracket 28A is made of one piece of Aluminum/Stainless Steel/Molded Industrial Strength non-Chemical Absorbent Plastic. The U-Shaped part of the Adjustable Toilet Mounting Bracket 28A fits down over the lip of the toilet bowl under the toilet seat and is held in place with Thumb Screw 24B. The rounded end Tab extending out is placed on either side of the Swing/Pivot Arm 4 and assembled with fastener 13K and Washer 11AA. The Wheelchair Stabilizing Device and the Adjustable Toilet Mourning Bracket 28A would be left on the toilet and readily available when the Wheelchair User transfers to and from the toilet. The Adjustable Toilet Mounting Bracket 28A is easy to install and easy to remove for cleaning. The fully assembled Device illustrated here in FIGS. 52-54 could be used in Private Homes, in Hospitals, Nursing Homes, Assisted Independent Living Centers, Group Homes, Senior Day Care Centers, Public Restrooms, and Handicapped Hotel/Motel Rooms. The Manual Wheelchair User could travel with the fully assembled Adjustable Toilet Mounting Bracket so as to have one handy at all times if he/she does not have the Wheelchair Stabilizing Device attached directly to their Manual Wheelchair.

Figure 55:
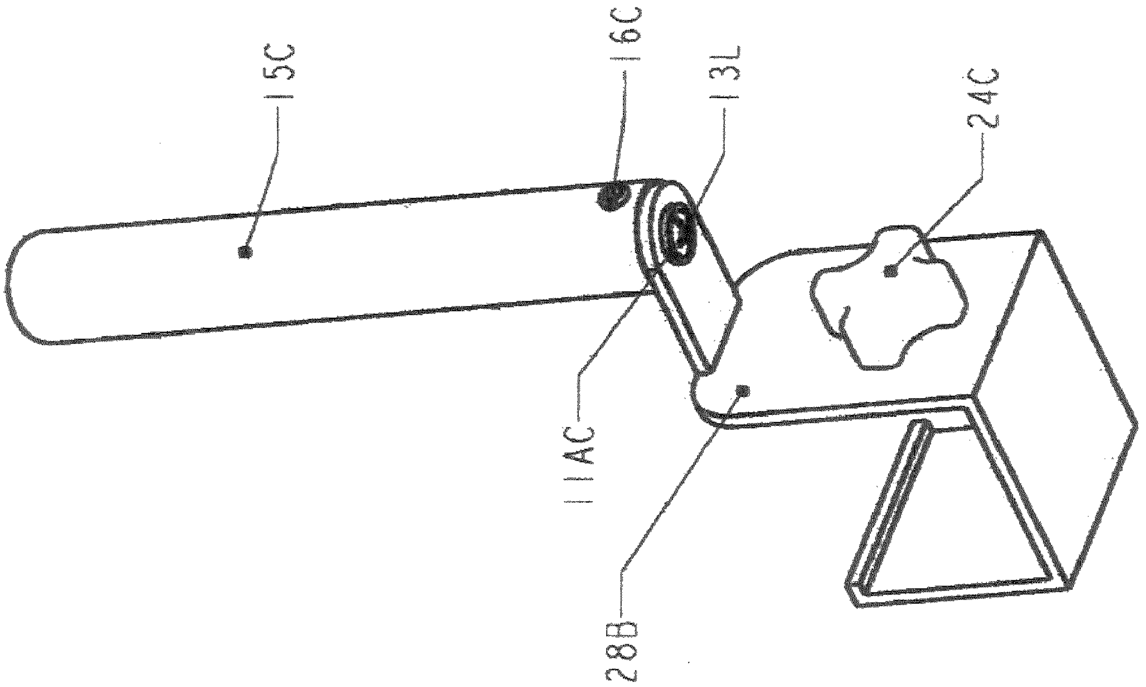
FIG. 55. is a perspective view of the receiving anchor post of FIG. 30 attached to the eighth optional mounting bracket illustrated in FIG. 52.
Figure 57:
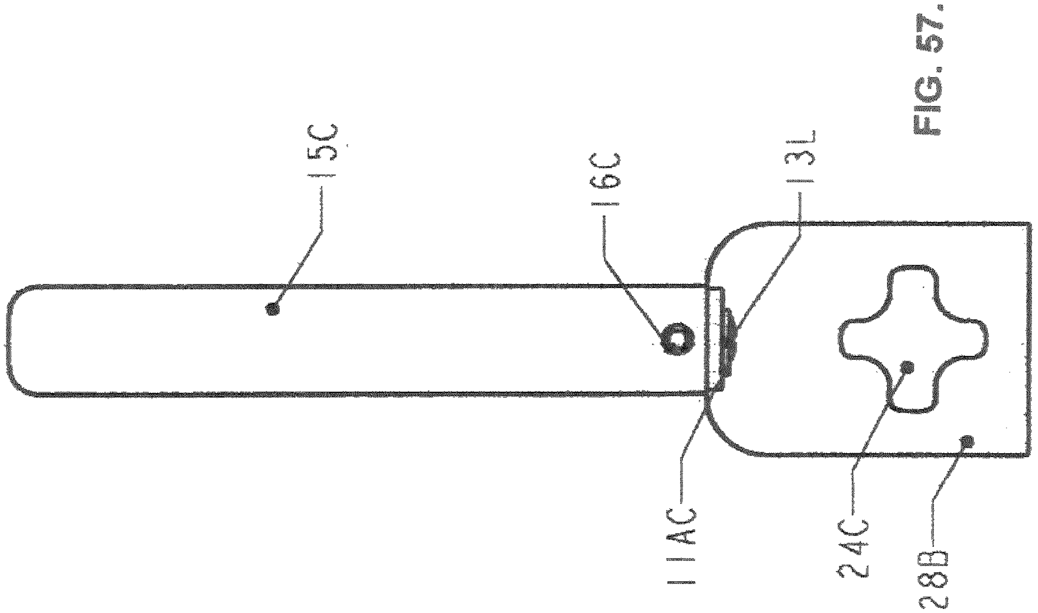
FIG. 57. is an end view of the device of FIG. 55.
Figure 56:
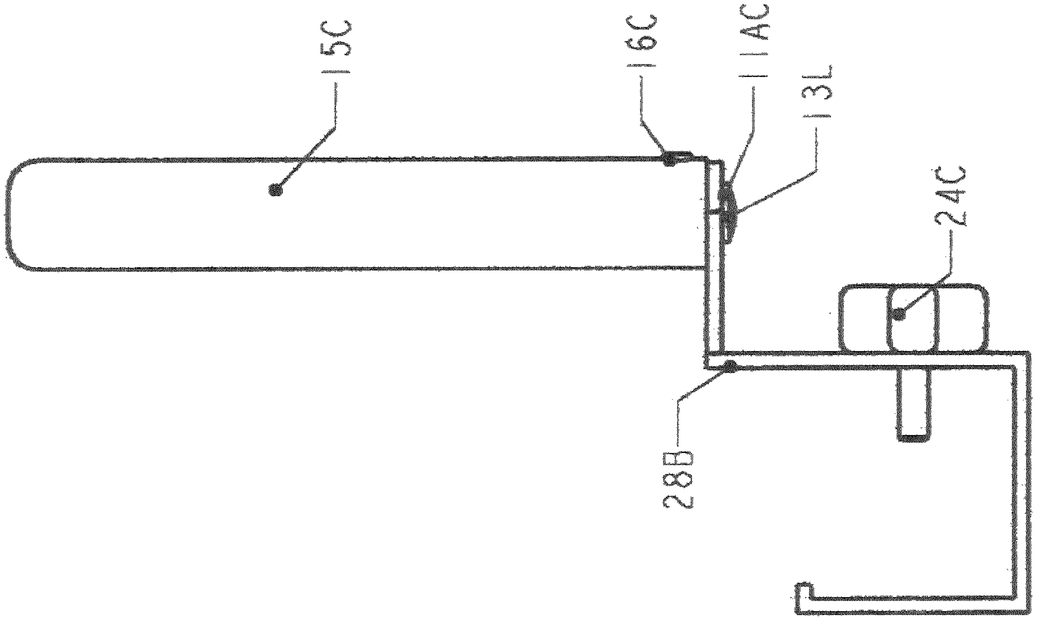
FIG. 56. is a side view of the device of FIG. 55.
Figure 58:
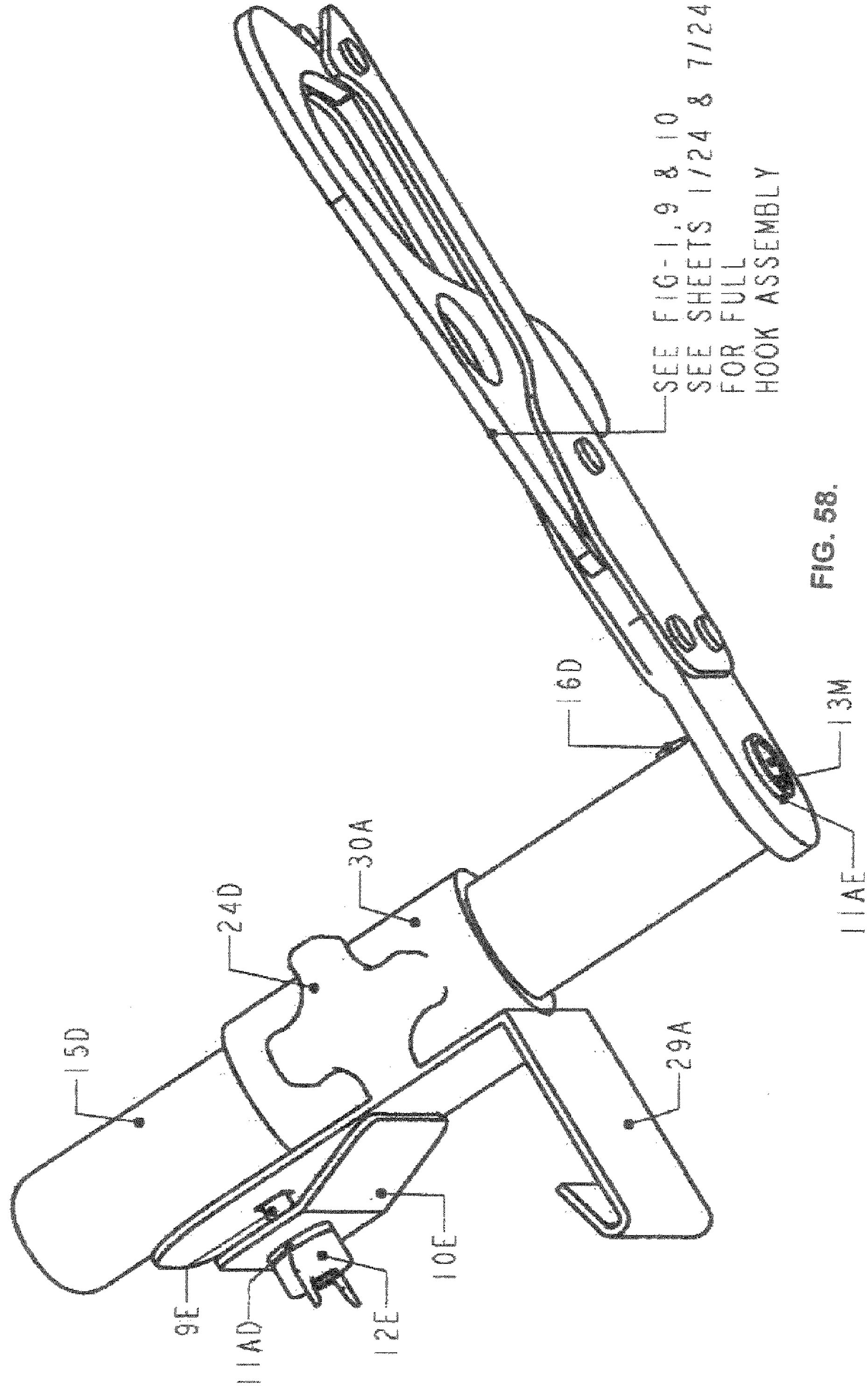
FIG. 58. is a perspective view of the device of FIG. 26 with a ninth optional mounting bracket.
Figure 60:
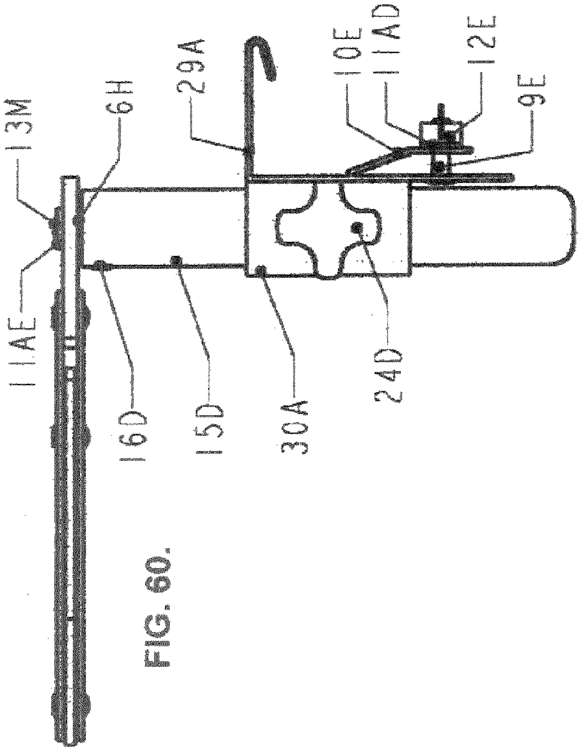
FIG. 60. is a top view of the device of FIG. 58.
Figure 61:
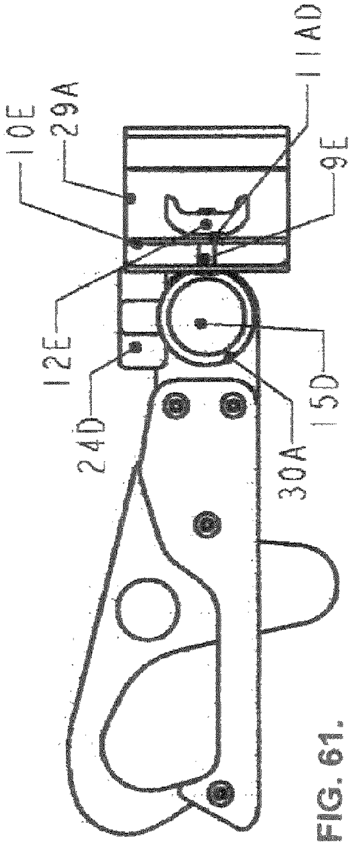
FIG. 61. is a side view of the device of FIG. 58.
Figure 59:
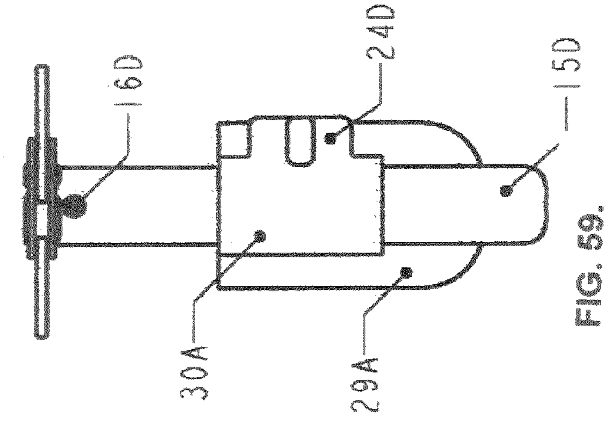
FIG. 59. is an end view of the device of FIG. 58.

FIGS. 55-57 show an alternative style of Adjustable Toilet Mounting Bracket 28B connected to Anchor Post 15C.

FIGS. 58-61 show a Universal Bed Mounting Bracket 29 fully assembled with the Wheelchair Stabilizing Device and an Anchor Post 15D. The Universal Bed Mounting Bracket 29 has a 180 degree bend with a 3/16th inch gap along one end, allowing it to fit over the top edge of the side rail of a hospital bed frame or the bottom edge of a Conventional Angle Iron Bed Frame. Towards the bottom of the bracket is a through hole. Carriage Bolt 9E is placed through the through hole from the front of the bracket and the Lockdown Plate 10E is placed over the carriage Bolt 9E. The bottom edge of the hospital angle bed frame or the top edge of the Conventional Angle Iron Bed Frame is sandwiched between the Universal Bed Mounting Bracket 29 and the Lockdown Plate 10E. The Lockdown Plate 10E is locked in place with Washer 11AD and Wing Nut 12E. Near the top of the Universal Bed Mounting Bracket 29, an adjustable tube 30A is welded/molded to the front of the Universal Bed Mounting Bracket 29. The tube 30A has a predrilled screw hole in which the Thumb Screw 24D is screwed into the hole to hold the Wheelchair Stabilizing Device and the Anchor Post 15D in position. The Wheelchair Stabilizing Device and the Anchor Post 15D is locked together with a fastener 13M, Washer 11AE and Set Screw 16D. When the Universal Bed Mounting Bracket 29 is mounted to the Hospital Bed frame or the Conventional Angle Iron Bed Frame and locked in place with the Carriage Bolt 9E, Lockdown Plate 10E, Washer 11AD, and Wing Nut 12E, the fully assembled Wheelchair Stabilizing Device and the Anchor Post 15D can be inserted in the adjustable tube 30A from either direction, where the Wheelchair Stabilizing Device could be at the top of the Universal Bed Mounting Bracket 29 or at the bottom of the Universal Bed Mounting Bracket 29. The fully assembled unit as illustrated here in FIGS. 58-61 would be permanently attached to the Hospital Bed or the Conventional Angle Iron Bed Frame and readily available to the Wheelchair User, Nurse, CNA, Home Health Care Worker, Personal Assistant, Family Member or Friend when transferring in and out of bed. The fully assembled Device illustrated here in FIGS. 58-61 could be used in Private Homes, in Hospitals, Nursing Homes, Assisted Independent Living Centers, and Group Homes. By being Universal the Wheelchair Stabilizing Device could be adjusted to accommodate many different styles and heights of manual wheelchairs.

A first aspect includes a method of using the wheelchair stabilizing device as described above, including (a) rotating the latch to the engaged position if it is in the disengaged position; (b) applying pressure at the distal end of the latch with a rod or bar such that the latch is forced into the open-position sufficient to securely hold the rod or bar in the at least partial enclosure or until the latch returns to the closed-position with the rod or bar securely held between the opposing latch arms; and (c) moving the latch to the open-position and retaining the latch in the open position while removing the rod or bar from between the two opposing latch arms.

A second aspect includes the method of aspect 1, further comprising: rotating the latch to the disengaged position.

A third aspect includes the method of aspect 1, further comprising: transferring a user to or from a wheelchair that has been stabilized by the rod or bar securely held in the at least partial enclosure or between the opposing latch arms.

A fourth aspect includes the method of aspect 1, wherein: the swing arm includes a variable length extendable shaft.

A fifth aspect includes the method of aspect 4, wherein: the variable length extendable shaft is biased to the shortest length.

A sixth aspect includes the method of aspect 5, wherein: the variable length extendable shaft is biased to the shortest length via spring or elastic.

A seventh aspect includes the method of aspect 4, wherein: the variable length extendable shaft includes a plurality of preset lengths at which the shaft may be temporarily secured.

An eighth aspect includes the method of aspect 1, wherein: the latch is connected to the swing arm via a swivel connection.

A ninth aspect includes the method of aspect 1, wherein: a compression spring is used to spring-bias the latch in the closed position.

A tenth aspect includes the method of aspect 1, wherein: a tension spring is used to spring-bias the latch in the closed position.

An $11^{th}$ aspect includes the method of aspect 1, wherein: the latch includes a first latch arm, a second latch arm in opposition to the first latch arm, and a third latch arm sized and shaped substantially similar to the first latch arm and in alignment with the first latch arm with the second opposing latch arm sandwiched between the first and third latch arm.

A $12^{th}$ aspect includes a method of manufacturing the wheelchair stabilizing device as described above, comprising (a) attaching the latch arms to the swing arm; and (b) attaching the mounting bracket to the swing arm.

A $13^{th}$ aspect includes the method of aspect 12, wherein: attaching the latch arms to the swing arm includes inserting a spring between the latch and the swing arm such that the latch is spring-biased in the closed-position.

A $14^{th}$ aspect includes the method of aspect 12, wherein: the swing arm includes a variable length extendable shaft.

A $15^{th}$ aspect includes the method of aspect 14, wherein: the variable length extendable shaft is biased to the shortest length.

A $16^{th}$ aspect includes the method of aspect 15, wherein: the variable length extendable shaft is biased to the shortest length via spring or elastic.

A $17^{th}$ aspect includes the method of aspect 14, wherein: the variable length extendable shaft includes a plurality of preset lengths at which the shaft may be temporarily secured.

A $18^{th}$ aspect includes the method of aspect 12, wherein: the latch is connected to the swing arm via a swivel connection.

A $19^{th}$ aspect includes the method of aspect 12, wherein: a compression spring is used to spring-bias the latch in the closed position.

A $20^{th}$ aspect includes the method of aspect 12, wherein: a tension spring is used to spring-bias the latch in the closed position.

A $21^{st}$ aspect includes the method of aspect 12, wherein: the latch includes a first latch arm, a second latch arm in opposition to the first latch arm, and a third latch arm sized and shaped substantially similar to the first latch arm and in alignment with the first latch arm with the second opposing latch arm sandwiched between the first and third latch arm.

Thus, while the present invention has been illustrated in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein, including, but not limited to, variations in size, materials, shape, form, function and manner of operation, assembly and use.

It is also to be understood that the following claims are intended to cover all of the generic and specific features of the invention herein described, and all statements of the scope of the invention which, as a matter of language, might be said to fall therebetween. Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A wheelchair restraint assembly for securing a wheelchair to a stationary object to prevent movement of the wheelchair away from the stationary object, the wheelchair having a frame, a seat, and wheels, the device comprising:

a latch mounted on one of the wheelchair and the object;

a bar on the other of the wheelchair and the object;

the latch having a pair of arms. with at least one arm being moveable between open and closed positions relative to the other arm;

the latch having biasing means to normally bias the latch to the closed position;

the arms automatically and temporarily moving to the open position when engaging the bar, whereby the bar is received into the latch; and then the arms automatically moving to the closed position to retain the bar within the latch, and thereby secure the wheelchair to the object so that a person can transfer between the wheel chair and the object without the wheelchair moving away from the object; and the latch or the bar on the wheelchair being on a front portion of the chair and reachable by a person sitting in the wheelchair so that the seated person can manually open the latch for release of the bar to allow the wheelchair to move away from the object.

2. The wheelchair restraint assembly of claim 1 further comprising a finger tab to manually override the biasing means and hold the latch arms in the open position.

3. The wheelchair restraint assembly of claim 1 wherein the biasing means is a spring to bias the latch arms to the closed position.

4. The wheelchair restraint assembly of claim 1 wherein the latch is mounted to one of the wheelchair and the object using a mounting bracket.

5. The wheelchair restraint assembly of claim 1 wherein the latch extends beyond the wheelchair frame when the wheelchair is secured to the object.

6. The wheelchair restraint assembly of claim 1 wherein the bar is a portion of the wheelchair frame.

7. The wheelchair restraint assembly of claim 4 wherein the mounting bracket and latch are pivotally connected.

8. The wheelchair restraint assembly of claim 4 further comprising a swing arm extending between the latch and the mounting bracket.

9. The wheelchair restraint assembly of claim 8 wherein the swing arm includes a variable length extendable shaft.

10. The wheelchair restraint assembly of claim 9 wherein the shaft is biased to a shortest length.

11. The wheelchair restraint assembly of claim 9 wherein the shaft has a plurality of preset lengths at which the shaft may be temporarily secured.

12. The wheelchair restraint assembly of claim 8 wherein the latch is pivotally connected to the swing arm.

13. The wheelchair restraint assembly of claim 1 wherein one of the latch arms includes a curved tip to move the latch to the open position when the tip engages the bar.

14. A wheelchair restraint assembly for securing a wheelchair to a stationary object to prevent movement of the wheelchair away from the stationary object, the wheelchair having a frame, a seat, and wheels, the device comprising:

a latch mounted on one of the wheelchair and the object;

a bar on the other of the wheelchair and the object;

the latch having a pair of arms, with at least one arm being moveable between open and closed positions relative to the other arm;

the latch having biasing means to normally bias the latch to the closed position;

the arms automatically and temporarily moving to the open position when engaging the bar, whereby the bar is received into the latch; and then the arms automatically moving to the closed position to retain the bar within the latch, and thereby secure the wheelchair to the object so that a person can transfer between the wheel chair and the object without the wheelchair moving away from the object; and wherein the latch extends beyond the wheelchair frame when the wheelchair is secured to the object.

15. The wheelchair restraint assembly of claim 14 wherein the latch or the bar on the wheelchair is on a front portion of the chair and reachable by a person sitting in the wheelchair so that the seated person can manually open the latch for release of the bar to allow the wheelchair to move away from the object.

16. The wheelchair restraint assembly of claim 14 further comprising a finger tab to manually override the biasing means and hold the latch arms in the open position.

17. The wheelchair restraint assembly of claim 14 wherein one of the latch arms includes a curved tip to move the latch to the open position when the tip engages the bar.

* * * * *